US010638086B2

(12) United States Patent
Ahn et al.

(10) Patent No.: US 10,638,086 B2
(45) Date of Patent: Apr. 28, 2020

(54) DISPLAY DEVICE CAPABLE OF CHANGING FRAME RATE AND OPERATING METHOD THEREOF

(71) Applicant: SAMSUNG DISPLAY CO., LTD., Yongin-si, Gyeonggi-Do (KR)

(72) Inventors: Gwangsoo Ahn, Suwon-si (KR); Po-yun Park, Seoul (KR); Hong-kyu Kim, Suwon-si (KR); Jimyoung Seo, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/707,456

(22) Filed: Sep. 18, 2017

(65) Prior Publication Data

US 2018/0103231 A1    Apr. 12, 2018

(30) Foreign Application Priority Data

Oct. 7, 2016    (KR) .......................... 10-2016-0130109

(51) Int. Cl.
*H04N 7/01*    (2006.01)
*G09G 3/36*    (2006.01)
(Continued)

(52) U.S. Cl.
CPC .......... *H04N 7/0127* (2013.01); *G09G 3/3648* (2013.01); *G09G 3/3696* (2013.01);
(Continued)

(58) Field of Classification Search
CPC ...... G09G 3/3648; G09G 3/3696; G09G 3/20;
G09G 3/3677; G09G 5/005; G09G 2320/0219; G09G 2320/0223; G09G 2320/0247; G09G 2330/00; G09G 2340/0435; G09G 2360/02; G09G 2360/06; G09G 2360/12
(Continued)

(56) References Cited

U.S. PATENT DOCUMENTS 9,311,875 B2    4/2016    Choi et al.
9,324,301 B2 *  4/2016    Shepelev ................ G06F 3/044
(Continued)

FOREIGN PATENT DOCUMENTS

KR    10-0832209    5/2008
KR    10-2015-0108172    9/2015
KR    10-2018-0049332    5/2018

*Primary Examiner* — Jefferey F Harold
*Assistant Examiner* — Omer Khalid
(74) *Attorney, Agent, or Firm* — F. Chau & Associates, LLC

(57) ABSTRACT

A display device includes a driving controller controlling a data driving circuit and providing a clock signal and a driving voltage in response to an image signal and a control signal received from an external source. The driving controller restores a data enable signal having a display period and a blank period in one frame on the basis of the control signal and sets a voltage level of the driving voltage applied to the gate driving circuit in accordance with a duration of the blank period. During a sequence of frames having a changing frame rate, the driving voltage for each respective frame may be set based on the duration of each respective blank period.

14 Claims, 17 Drawing Sheets

(51) Int. Cl.
  *G09G 5/00* (2006.01)
  *G09G 3/20* (2006.01)
(52) U.S. Cl.
  CPC .............. *G09G 5/005* (2013.01); *G09G 3/20* (2013.01); *G09G 3/3677* (2013.01); *G09G 2320/0219* (2013.01); *G09G 2320/0223* (2013.01); *G09G 2320/0247* (2013.01); *G09G 2330/00* (2013.01); *G09G 2340/0435* (2013.01); *G09G 2360/02* (2013.01); *G09G 2360/06* (2013.01); *G09G 2360/12* (2013.01); *G09G 2360/18* (2013.01)
(58) Field of Classification Search
  USPC ........................................................ 345/205
  See application file for complete search history.

(56) References Cited

U.S. PATENT DOCUMENTS

| | | | |
|---|---|---|---|
| 2012/0223927 A1 | 9/2012 | Hsieh et al. | |
| 2015/0262554 A1* | 9/2015 | Park | G09G 3/20 345/212 |
| 2015/0371609 A1* | 12/2015 | Choi | G09G 3/3406 345/205 |
| 2016/0275903 A1 | 9/2016 | Park et al. | |

* cited by examiner

DISPLAY DEVICE CAPABLE OF CHANGING FRAME RATE AND OPERATING METHOD THEREOF

CROSS-REFERENCE TO RELATED APPLICATION

This U.S. non-provisional patent application claims priority under 35 U.S.C. § 119 from Korean Patent Application No. 10-2016-0130109, filed on Oct. 7, 2016, the contents of which are incorporated by reference herein.

TECHNICAL FIELD

The present disclosure relates to a display device capable of changing a frame rate and a method of operating the display device.

DISCUSSION OF THE RELATED ART

A display device includes a plurality of gate lines, a plurality of data lines, and a plurality of pixels respectively connected to the gate lines and respectively connected to the data lines. The display device includes a gate driving circuit that applies gate signals to the gate lines and a data driving circuit that applies data signals to the data lines. A graphic processor, which is a type of processor specifically designed to execute graphics operations including 2D and 3D calculations and offload graphics processing from a CPU, may be used to render images that rapidly change and/or have large amounts of detail.

However, a graphic processor may require a relatively large amount of time to process frames to render a high definition game image or a virtual reality image. Thus, when a time to process a frame becomes longer than a frame rate of the display device, a quality of an image displayed by the display device deteriorates.

SUMMARY

Embodiments of the inventive concept provide a display device including a display panel comprising a plurality of gate lines, a plurality of data lines, and a plurality of pixels respectively connected to the gate lines and respectively connected to the data lines; a gate driving circuit having inputs to receive a clock signal and a driving voltage to drive the gate lines; a data driving circuit configured to drive the data lines; and a driving controller is configured to control the data driving circuit in response to an input of an image signal and a control signal from an external source, and output the clock signal and the driving voltage to the gate driving circuit, the driving controller is configured to generate a data enable signal comprising a display period and a blank period in one frame and set a voltage level of the driving voltage applied to the gate driving circuit according to a length of time of the blank period.

The driving controller sets the voltage level of the driving voltage to a voltage level that is higher than a normal level during the blank period of the frame.

The gate driving circuit may sequentially drive the gate lines in response to the clock signal and may discharge the gate lines to a voltage level of the driving voltage.

The driving controller may include a controller that restores (e.g. generates) the control signal to the data enable signal, outputs a clock pulse signal in synchronization with the data enable signal, and outputs a voltage level control signal corresponding to the duration of the blank period of the data enable signal and a clock generating circuit that generates the clock signal in response to the clock pulse signal, and generates the driving voltage having a voltage level corresponding to the voltage level control signal.

The controller of the driving controller may include a receiver that restores the control signal to the data enable signal and a control signal generator that outputs the clock pulse signal in synchronization with the data enable signal and outputs the voltage level control signal corresponding to the duration of the blank period of the data enable signal.

The control signal generator includes a frame rate detector that detects a frame rate on the basis of the display period and the blank period of the data enable signal, a voltage controller outputting the voltage level control signal corresponding to the detected frame rate, and a clock generator generating the clock pulse signal.

The control signal generator restores the data enable signal on the basis of the control signal, for example, at every frame, and sets the voltage level of the driving voltage.

The driving controller includes a frame memory in which the image signal of a present frame is stored, an image signal processor that converts an image signal of a previous frame output from the frame memory to a data voltage signal, and a transmitter that applies the data voltage signal to the data driver, and the control signal generator restores the data enable signal on the basis of the control signal of the previous frame and sets the voltage level of the driving voltage applied to the gate driving circuit according to the duration of the blank period.

The driving controller sets a pulse width of the clock signal applied to the gate driving circuit according to the duration of the blank period.

The pulse width of the clock signal set by the driving controller becomes wider as the duration of the blank period decreases.

The driving controller includes a controller that restores the control signal to the data enable signal, outputs a clock pulse signal in synchronization with the data enable signal, and outputs a voltage level control signal having a voltage level corresponding to the duration of the blank period of the data enable signal and a clock pulse signal having a pulse width corresponding to the duration of the blank period, and a clock generating circuit sets the voltage level of the driving voltage in response to the voltage level control signal and generates the clock signal in response to the clock pulse signal. The controller may include a receiver restoring the control signal to the data enable signal, and a control signal generator may be configured to output the clock pulse signal in synchronization with the data enable signal and output the voltage control signal corresponding to the duration of the blank period of the data enable signal.

The control signal generator may include a frame rate detector detecting a frame rate on the basis of the display period and the blank period of the data enable signal, a voltage controller that outputs the voltage level control signal corresponding to the detected frame rate, and a clock generator that generates the clock pulse signal in response to the data enable signal. The clock pulse signal has a pulse width corresponding to the detected frame rate during the blank period.

Embodiments of the inventive concept provide a display device including a display panel having a plurality of gate lines, a plurality of data lines, and a plurality of pixels respectively connected to the gate lines and respectively connected to the data lines, a gate driving circuit that receives a clock signal and a driving voltage to drive the gate lines, a data driving circuit driving the data lines, and a driving controller that controls the data driving circuit in response to an image signal and a control signal from an external source and applying the clock signal and the driving voltage to the gate driving circuit. The driving controller restores a data enable signal including a display period and a blank period in one frame on the basis of the control signal and sets a pulse width of the clock signal applied to the gate driving circuit during the blank period according to a duration of the blank period.

The pulse width of the clock signal set by the driving controller becomes wider as the duration of the blank period decreases.

The driving controller includes a controller restoring the control signal to the enable signal, outputs a clock pulse signal in synchronization with the data enable signal, and outputs the clock pulse signal having the pulse width corresponding to the duration of the blank period of the data enable signal and a clock generating circuit that generates the clock signal in response to the clock pulse signal and generating the driving voltage having a voltage level corresponding to a voltage level control signal, and the pulse width of the clock pulse signal output from the controller during the blank period corresponds to the duration of the blank period.

The controller includes a receiver that restores the control signal to the data enable signal and a control signal generator that outputs the clock pulse signal in synchronization with the data enable signal and outputting the clock pulse signal having the pulse width corresponding to the duration of the blank period of the data enable signal.

The control signal generator may include a frame rate detector detecting a frame rate on the basis of the display period and the blank period of the data enable signal and a clock generator generating the clock pulse signal in response to the data enable signal. The clock pulse signal has a pulse width corresponding to the detected frame rate during the blank period.

Embodiments of the inventive concept provide a display device including a display panel including a plurality of gate lines, a plurality of data lines, and a plurality of pixels respectively connected to the gate lines and respectively connected to the data lines, a gate driving circuit receiving a clock signal and a driving voltage to drive the gate lines, a data driving circuit driving the data lines, and a driving controller that controls the data driving circuit in response to an image signal, a control signal, and a frame rate signal from an external source and applying the clock signal and the driving voltage to the gate driving circuit. The driving controller restores a data enable signal including a display period and a blank period in one frame on the basis of the control signal and sets a voltage level of the driving voltage applied to the gate driving circuit according to the frame rate signal.

The gate driving circuit may sequentially drive the gate lines in response to the clock signal and discharges the gate lines to the voltage level of the driving voltage during the blank period.

The driving controller sets a pulse width of the clock signal applied to the gate driving circuit during the blank period in accordance with the frame rate signal.

A display device may include a display panel a plurality of gate lines, a plurality of data lines, and a plurality of pixels respectively connected to the gate lines and respectively connected to the data lines; a gate driving circuit receives a clock signal and a driving voltage to drive the gate lines and includes respective first and second ground terminals to receive a respective first ground voltage and a second ground voltage; a data driving circuit that is configured to drive the data lines; a driving controller that receives an image signal and a control signal from an external source and applies the clock signal and the driving voltage based on received image signal and the control signal, and the driving controller outputs the first ground voltage and the second ground voltage to the gate driving circuit; and wherein the first ground voltage has a different voltage level from that of the second ground voltage, and when a frame to be displayed by the display panel has a display period and a blank period, the driving controller sets the voltage level of the second ground voltage based on a blank period of a frame.

Embodiments of the inventive concept provide a method of driving a display device, including the operations of receiving a control signal, generating a data enable signal having a display period and a blank period in one frame on the basis of the control signal, counting a time of the blank period of the data enable signal, setting a voltage level of a driving voltage to a first level when a duration of the blank period is smaller than a first reference value, setting the voltage level of the driving voltage to a second level when the duration of the blank period is equal to or greater than a first reference value, and applying the driving voltage to a gate driving circuit.

The gate driving circuit discharges a plurality of gate lines connected to a plurality of pixels to the voltage level of the driving voltage during the blank period.

The first level of the driving voltage is higher than the second level of the driving voltage.

The method may further include generating a clock pulse signal on the basis of the data enable signal, setting a pulse width of the clock pulse signal to a first time value during the blank period when the duration of the blank period is smaller (e.g. less) than the first reference value, setting the pulse width of the clock pulse signal to a second time value during the blank period when the duration of the blank period is equal to or greater than the first reference value, and applying (e.g. outputting) a clock signal corresponding to the clock pulse signal to the gate driving circuit.

The gate driving circuit sequentially drives the gate lines in response to the clock signal and discharges the gate lines to the voltage level of the driving voltage during the blank period.

The first time value (to which the pulse width of the clock pulse signal is set when the duration of the blank period is smaller (e.g. less) than the first reference value) is longer than the second time value.

According to the above, when the frame rate is changed, the display device may set the voltage level of the driving voltage provided to the gate driving circuit during the blank period on the basis of the duration of the blank period. In addition, the pulse width of the gate clock signal provided to the gate driving circuit during the blank period may be set in accordance with the duration of the blank period.

Although the duration of the blank period is varied due to the change of the frame rate, the brightness may be prevented from being varied. Accordingly, the display quality of the image displayed through the display device may be increased. In an embodiment of the inventive concept, a display device may include a display panel including a plurality of gate lines, a plurality of data lines, and a plurality of pixels respectively connected to the gate lines and respectively connected to the data lines;

a gate driving circuit that receives a clock signal and a driving voltage to drive the gate lines and includes respective first and second ground terminals to receive a respective first ground voltage and a second ground voltage;

a data driving circuit configured to drive the data lines;

a driving controller that receives an image signal and a control signal from an external source and applies the clock signal and the driving voltage based on received image signal and the control signal, and the driving controller outputs the first ground voltage and the second ground voltage to the gate driving circuit; and wherein the first ground voltage has a different voltage level from that of the second ground voltage, and when a frame to be displayed by the display panel has a display period and a blank period, the driving controller sets the voltage level of the second ground voltage based on a blank period of a frame.

In an embodiment, the driving controller raises a voltage level of the second ground voltage during the blank period of the frame.

In an embodiment, when a plurality of frames to be displayed by the display have respective blank periods, the driving controller sets the voltage level of the second ground voltage on the basis of a duration of the respective blank periods of the plurality of frames.

In an embodiment, the driving controller sets a pulse width of the clock signal applied to the gate driving circuit according to the duration of the blank period.

In an embodiment, the pulse width of the clock signal set by the driving controller becomes wider as the duration of the blank period decreases.

BRIEF DESCRIPTION OF THE DRAWINGS

The teachings of the present disclosure will be better appreciated by a person of ordinary skill in the art with reference to the following detailed description when considered in conjunction with the accompanying drawings wherein.

DETAILED DESCRIPTION

Hereinafter, the inventive concept will be explained in detail with reference to the accompanying drawings.

Figure 1:
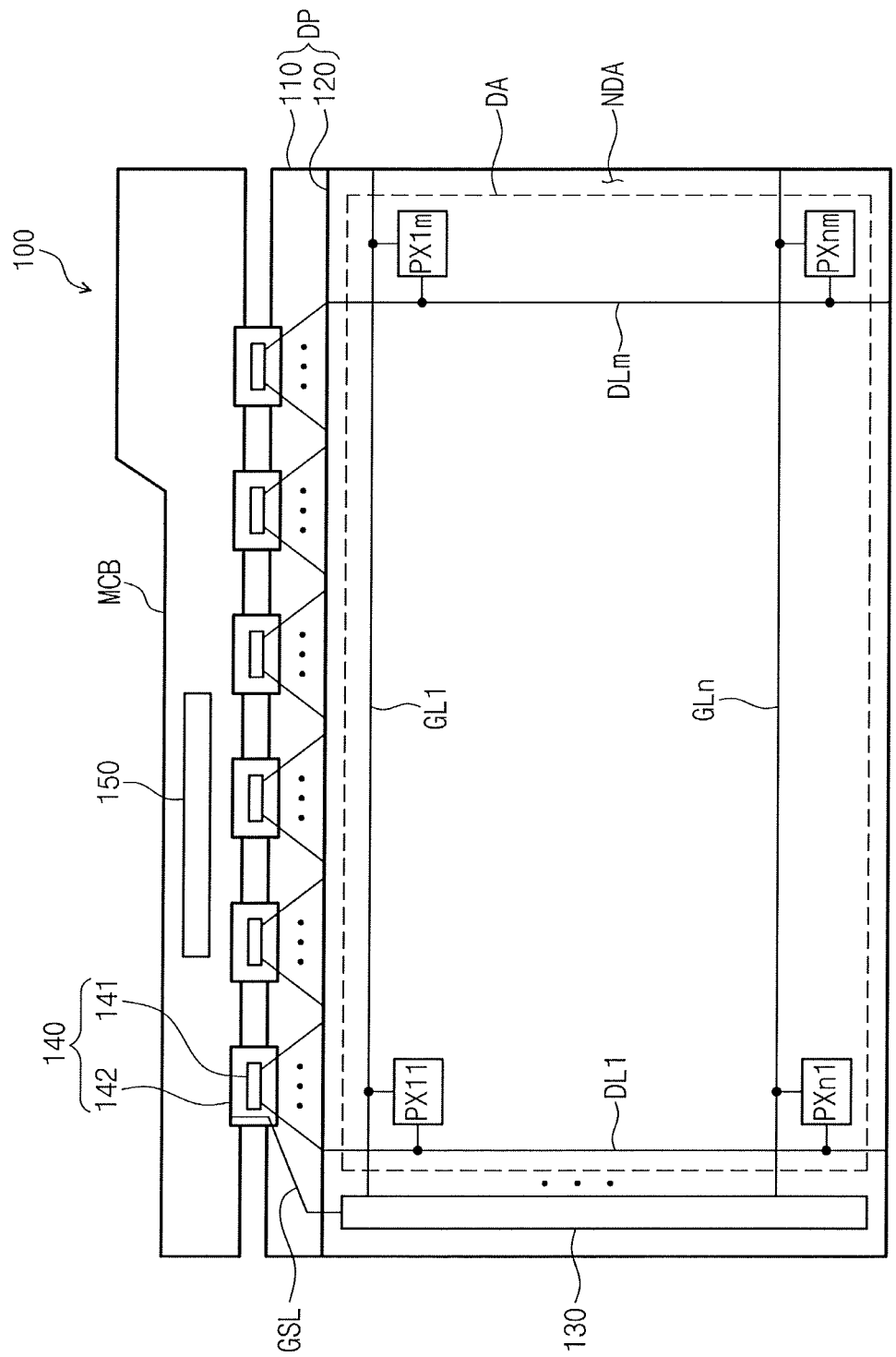
FIG. 1 is a plan view showing a display device according to an exemplary embodiment of the inventive concept.
Figure 2:
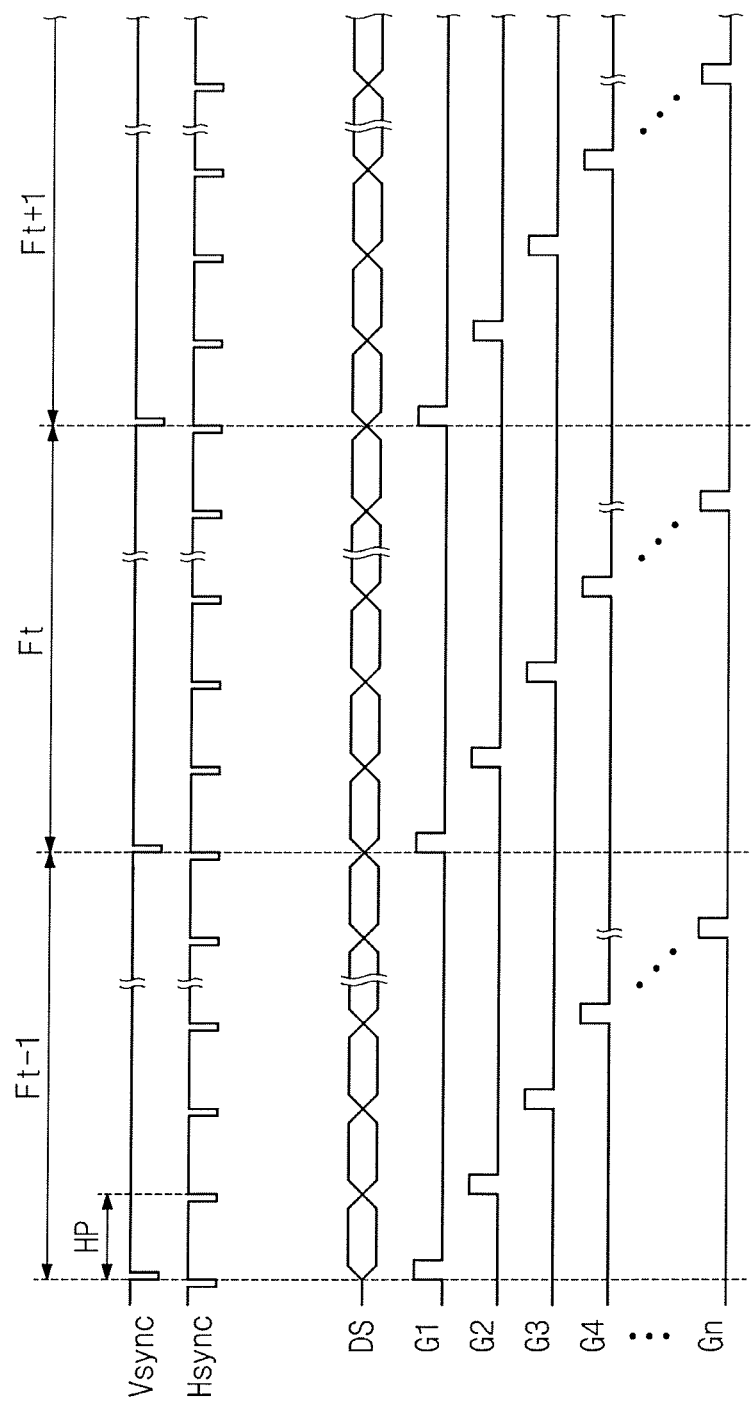
FIG. 2 is a timing diagram showing signals of the display device according to an exemplary embodiment of the inventive concept.

FIG. 1 is a plan view showing a display device 100 according to an exemplary embodiment of the inventive concept. FIG. 2 is a timing diagram showing signals of the display device 100 according to an exemplary embodiment of the present disclosure.

Referring to FIGS. 1 and 2, the display device 100 may includes a display panel DP, a gate driving circuit 130, a data driving circuit 140, and a driving controller 150. The gate driving circuit 130 and the data driving circuit 140 are communicatively connected to the driving controller 150.

The structure of the display panel DP may be, for example, a liquid crystal display panel, an organic light emitting display panel, an electrophoretic display panel, or an electrowetting display panel, but the present disclosure and the appended claims are not limited thereto or thereby. In the present exemplary embodiment, the liquid crystal display panel will be described as the display panel DP. Meanwhile, the display device 100 including the liquid crystal display panel may further include a polarizer, and a backlight unit, etc., which are not shown in figures.

The display panel DP shown in FIG. 1 may include a first substrate 110, a second substrate 120 spaced apart from the first substrate 110, and a liquid crystal layer (not shown) interposed between the first substrate 110 and the second substrate 120. The display panel DP may include a display area DA in which a plurality of pixels PX11 to PXnm is arranged and a non-display area NDA surrounding the display area DA when viewed in a plan view.

The display panel DP may include a plurality of gate lines GL1 to GLn disposed on the first substrate 110 and a plurality of data lines DL1 to DLm crossing the gate lines GL1 to GLn. The gate lines GL1 to GLn are connected to the gate driving circuit 130. The data lines DL1 to DLm may be connected to the data driving circuit 140. FIG. 1 shows a portion of the gate lines GL1 to GLn and a portion of the data lines DL1 to DLm.

FIG. 1 shows only a portion of the pixels PX11 to PXnm so as not to obscure an artisan's appreciation of the inventive concept. Each of the pixels PX11 to PXnm is connected to a corresponding gate line of the gate lines GL1 to GLn and a corresponding data line of the data lines DL1 to DLm.

The pixels PX11 to PXnm are arranged in a plurality of pixel groups in accordance with colors displayed therethrough. Each of the pixels PX11 to PXnm may display one of primary colors that may be used to display other colors that may be a composite of the primary colors. The primary colors may include a red color, a green color, a blue color, and a white color, but the primary colors are not limited thereto or thereby. For example, the primary colors may further include a variety of colors, such as a yellow color, a cyan color, a magenta color, etc. The gate driving circuit 130 and the data driving circuit 140 may receive a control signal from the driving controller 150.

For example, a gate driving circuit may establish or break the electrical continuity of a gate voltage that may be supplied to a gate terminal of a transistor in response to, for example, an on command or an off command from the driving controller, The gate driving circuit may supply pulses to the gate lines that are synchronized with data voltages from the data driving circuit. A data driving circuit may convert data of an image into data voltages that are provided via data lines to particular pixels for output.

The driving controller 150 is mounted on a main circuit board MCB (see FIG. 1). The driving controller 150 receives an image signal and the control signal from an external graphic controller (not shown). In accordance with FIG. 2, the control signal includes a vertical synchronization signal Vsync as a signal to distinguish frame periods Ft−1, Ft, and Ft+1 from each other, a horizontal synchronization signal Hsync as a signal to distinguisht horizontal periods HP from each other, a data enable signal maintained at a high level during a period, in which data are output, to indicate a data input period, and clock signals.

The gate driving circuit 130 generates gate signals G1 to Gn on the basis of the control signal provided through a signal line GSL from the driving controller 150 during the frame periods Ft−1, Ft, and Ft+1 and outputs the gate signals G1 to Gn to the gate lines GL1 to GLn. The gate signals G1 to Gn are sequentially output to correspond to the horizontal periods HP. The gate driving circuit 130 may be substantially simultaneously formed with the pixels PX11 to PXnm through a thin film process. For instance, the gate driving circuit 130 may be mounted on the non-display area NDA in the form of an oxide semiconductor TFT gate driver circuit (OSG).

FIG. 1 shows one gate driving circuit 130 connected to left ends of the gate lines GL1 to GLn. In the present exemplary embodiment, the display device 100 may include two gate driving circuits. When two gate driving circuits are included, one of the two gate driving circuits may be connected to the left ends of the gate lines GL1 to GLn, and the other gate driving circuit may be connected to right ends of the gate lines GL1 to GLn. In addition, one of the two gate driving circuits may be connected to odd-numbered gate lines of the gate lines GL1 to GLn, and the other gate driving circuit may be connected to even-numbered gate lines of the gate lines GL1 to GLn.

The data driving circuit 140 generates grayscale voltages in accordance with data voltage provided from the driving controller 150 based on the control signal provided from the driving controller 150. The data driving circuit 140 outputs the grayscale voltages to the data lines DL1 to DLm as data voltages DS.

The data voltages DS may include, for example, positive data voltages having a positive value with respect to a common voltage and/or negative data voltages having a negative value with respect to the common voltage. Among the data voltages DS applied to the data lines DL1 to DLm during each of the horizontal periods HP, one portion of the data voltages has a positive polarity, and the other portion of the data voltages has a negative polarity. The polarity of the data voltages DS may be inverted in accordance with the frame periods Ft−1, Ft, and Ft+1 to prevent, for example, a liquid crystal from burning and deteriorating. The data driving circuit 140 may generate data voltages inverted at every frame period in response to an inversion signal.

The data driving circuit 140 may include a driving chip (e.g. semiconductor) 141 and a flexible printed circuit board 142 on which a driving chip 141 may be mounted. Each of the driving chip 141 and the flexible printed circuit board 142 may be provided in plural quantities. The flexible printed circuit board 142 electrically connects the main circuit board MCB to the first substrate 110. Each of the driving chips 141 provides a corresponding data signal to a corresponding data line of the data lines DL1 to DLm.

FIG. 1 also shows the data driving circuit 140 in the form of a tape carrier package (TCP). According to another exemplary embodiment of the present disclosure, the data driving circuit 140 may be arranged in the non-display area NDA of the first substrate 110 in a chip-on-glass (COG) manner.

Figure 3:
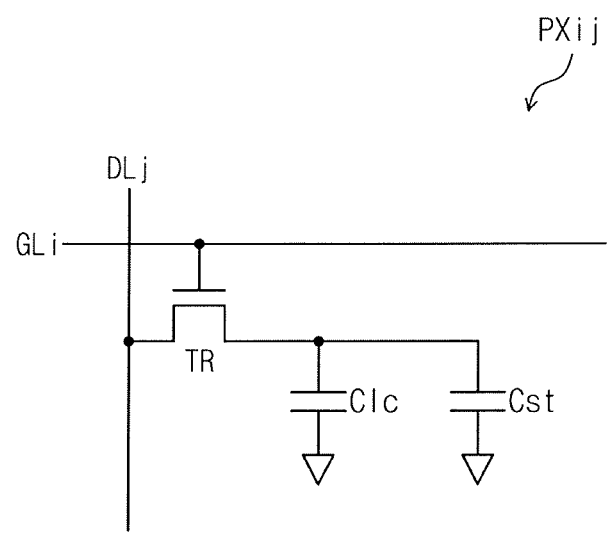
FIG. 3 is an equivalent circuit diagram of a pixel according to an exemplary embodiment of the inventive concept.

FIG. 3 is an equivalent circuit diagram of a pixel PXij according to an exemplary embodiment of the present disclosure. Each of the pixels PX11 to PXnm shown in FIG. 1 may have the equivalent circuit shown in FIG. 3.

Referring now to FIG. 3, the pixel PXij includes a pixel thin film transistor TR (hereinafter, referred to as a pixel transistor), a liquid crystal capacitor Clc, and a storage capacitor Cst. Hereinafter, the transistor of the present inventive concept refers to a thin film transistor. In the present exemplary embodiment, the storage capacitor Cst may be omitted. The pixel transistor TR is electrically connected to an i-th gate line GLi and a j-th data line DLj. The pixel transistor TR outputs a pixel voltage corresponding to a data signal provided through the j-th data line DLj in response to a gate signal provided through the i-th gate line GLi.

With continued reference to FIG. 3, the liquid crystal capacitor Clc is charged with the pixel voltage output from the pixel transistor TR. An alignment of liquid crystal directors included in the liquid crystal layer LCL (refer to FIG. 4) is changed depending on an amount of electric charge stored in the liquid crystal capacitor Clc. A light incident to the liquid crystal layer transmits through or is blocked by the liquid crystal layer in accordance with the alignment of the liquid crystal directors.

The storage capacitor Cst is connected in parallel to the liquid crystal capacitor Clc. The storage capacitor Cst maintains the alignment of the liquid crystal directors during a display period. An amount of time in which the storage capacitor Cst can be used to maintain the alignment of the liquid crystal directors is based in part on an amount of charge stored by the storage capacitor Cst and the capacitance value of Cst.

Figure 4:
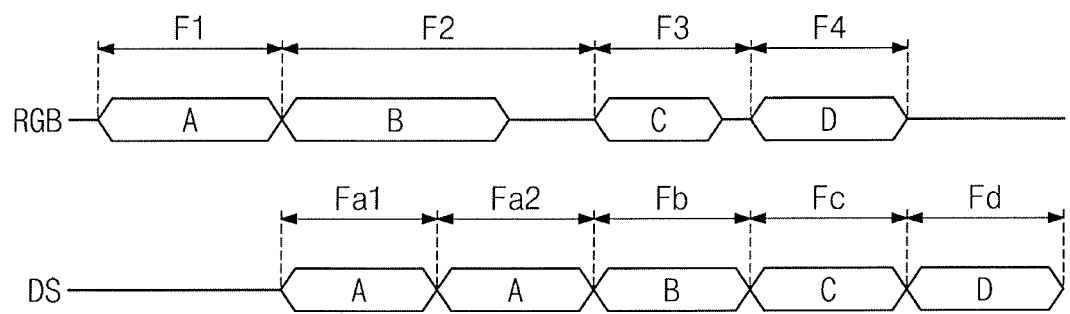
FIGS. 4 and 5 are timing diagrams showing an image signal displayed through the display device in accordance with an image signal provided from an external source.
Figure 5:
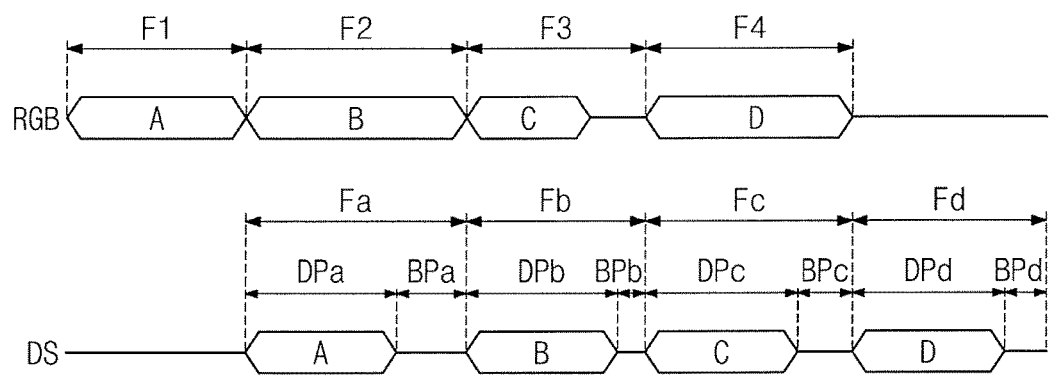

FIGS. 4 and 5 are timing diagrams showing an image signal displayed through the display device in accordance with the image signal provided from an external source.

Referring to FIGS. 1 and 4, an image signal RGB provided from the external source may be a signal that is rendered by a graphic processor (not shown). A frame rate of the image signal RGB may be changed depending on a rendering time of the graphic processor. For instance, a frame rate of a frame F2 is smaller than a frame rate of other frames F1, F3, and F4.

Hereinafter, the frame rate refers to the number of frames transmitted during one second (i.e., the number of frames per second), a duration of one frame decreases as the frame rate becomes greater, and the duration of one frame increases as the frame rate becomes smaller.

With reference to FIG. 4, the image signal RGB is processed by the driving controller 150 of the display device 100, delayed by one frame, and output as the data voltage DS. When the frame rate of the display device 100 is fixed, the data voltage DS of a present frame may be repeatedly provided to the data lines DL1 to DLm until all the image signal RGB of a next frame is received.

For instance, FIG. 4 shows that since "B" image signal RGB of the next frame is not entirely received while "A" data voltage DS of a frame Fa1 are provided to the data lines DL1 to DLm, the "A" data voltage DS are provided again to the data lines DL1 to DLm in the frame Fa2. Therefore, "B" data voltage DS are provided to the data lines DL1 to DLm in a frame Fb.

As discussed above, in a case that the same data voltage DS are repeatedly provided to the data lines DL1 to DLm during consecutive frames Fa1 and Fa2, a user may recognize the image displayed on the display panel DP as an unnatural image. In particular, if the image is not a stationary image, the repeat of the image in consecutive frames may be recognized by the user.

Referring to FIGS. 1 and 5, in a case where the frame rate of the image signal RGB is changed in accordance with the rendering time of the graphic processor, a frame rate of the display device 100 may be changed.

For example, the frame rate of the display device 100 may be the same as a frame rate of a frame delayed by one frame from that of the image signal RGB provided from the external source. For example, a frame rate of a frame Fa in which the "A" data voltage DS of the display device 100 are output is equal to a frame rate of a frame F2 in which the "B" image signal RGB is received. A frame rate of a frame Fb in which the "B" data voltage DS of the display device 100 are output is equal to a frame rate of a frame F3 in which the "C" image signal RGB is received.

One frame of the display device 100 includes a display period in which the data voltage DS are output and a blank period BP without an output of the data voltage DS. In the frames Fa, Fb, Fc, and Fd of the display device 100, durations of the display periods DPa, DPb, DPc, and DPd, during which the data voltage DS "A", "B", "C", and "D" are respectively output, are the same as each other. The durations of the blank periods BPa, BPb, BPc, and BPd may be changed depending on a difference between the frame rate of each of the frames Fa, Fb, Fc, and Fd and the display periods DPa, DPb, DPc, and DPd.

As shown in FIG. 5, since the frame rate of the frame Fa in which the "A" data voltage DS are output is smaller than the frame rate of the frame Fb in which the "B" data voltage DS are output, the duration of the blank period BPa is longer than the duration of the blank period BPb. It is also shown that the blank period BPc is larger than BPd based on the difference in the frame rate.

As previously discussed, an alignment of liquid crystal directors included in a liquid crystal layer LCL may change depending on an amount of electric charge stored in the liquid crystal capacitor Clc. Thus, as shown in FIG. 3, the pixel PXij includes a storage capacitor Cst arranged in parallel with the liquid crystal capacitor Clc to maintain the alignment during one frame. However, when the frame rate is relatively lower, the blank period is relatively longer, and the electric charges stored in the liquid crystal capacitor Clc and the storage capacitor Cst decrease due to a leakage current of the pixel PXij. Thus, when the duration of the blank period is relatively longer, a brightness of the image displayed in the pixel PXij is relatively lowered. In a case where the frame rate is changed at, for example, every frame, then the duration of the blank period is also changed at every frame, and the amount of brightness varies at every frame. As a result, the user may recognize a flicker on a screen.

Figure 6:
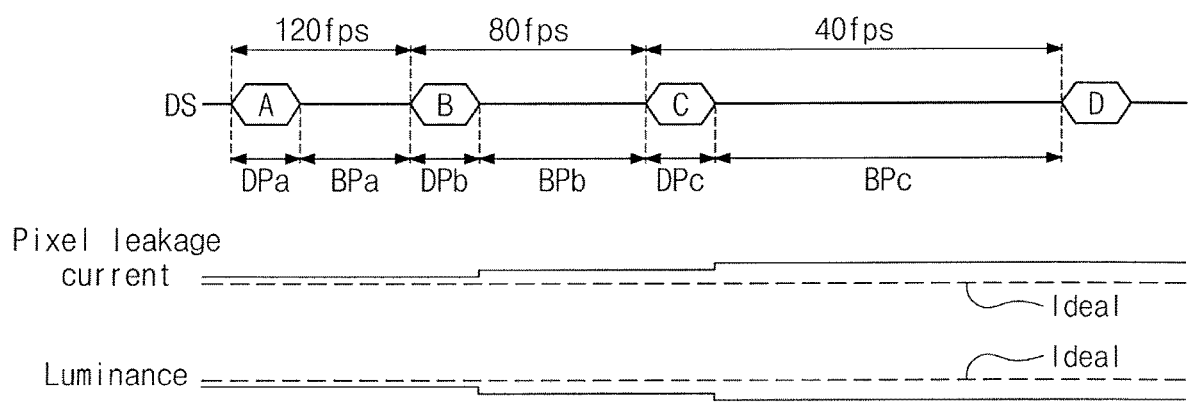
FIG. 6 is a diagram showing a variation in brightness of an image depending on a frame rate.

FIG. 6 is a diagram showing an example of a variation in brightness in an image depending on a frame rate.

Referring to FIG. 6, in a case where the frame rate decreases, e.g. from 120 fps, 80 fps, to 40 fps, the duration of the blank periods BPa, BPb, and BPc increases, the result is an increase in an amount of pixel leakage current. The increase in the amount of pixel leakage current decreases the brightness of the image displayed. In a case where the brightness of the image is changed due to a varying frame rate, the user may recognize the flicker on the screen.

Figure 7:
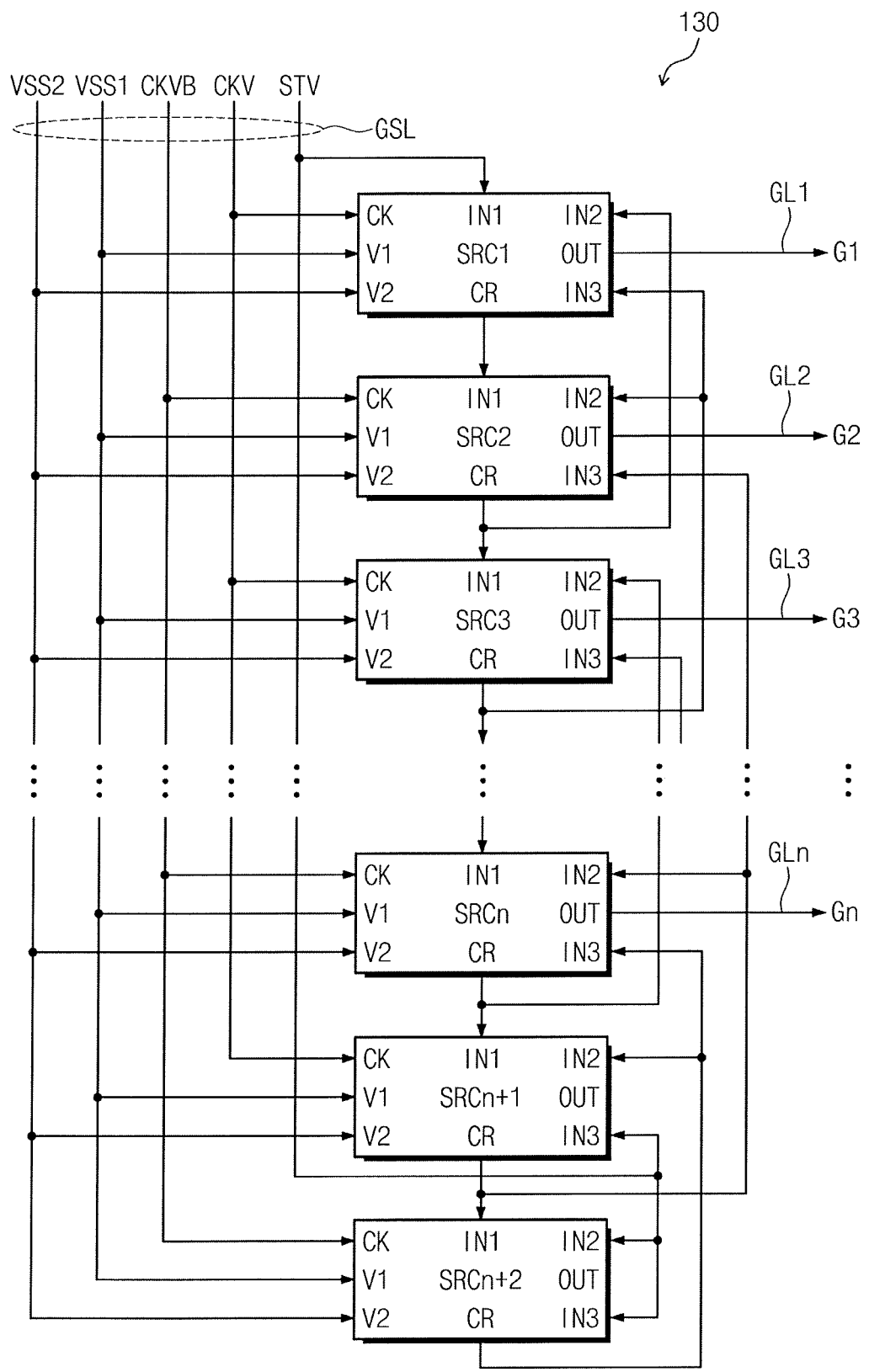
FIG. 7 is a block diagram showing a gate driving circuit according to an exemplary embodiment of the present disclosure.

FIG. 7 is a block diagram showing the gate driving circuit 130 according to an exemplary embodiment of the present inventive concept.

Referring now to FIG. 7, the gate driving circuit 130 includes a plurality of driving stages SRC1 to SRCn and "dummy" driving stages SRCn+1 and SRCn+2. The driving stages SRC1 to SRCn and the dummy driving stages SRCn+1 and SRCn+2 may have a dependent connected relation (e.g. a cascaded arrangement) with each other such that each of the driving stages SRC1 to SRCn and the dummy driving stage SRCn+1 is operated in response to a carry signal output from a previous stage and a carry signal output by a next stage in the cascaded arrangement.

Each of the driving stages SRC1 to SRCn receives a first clock signal CKV, a second clock signal CKVB, a first ground voltage VSS1, and a second ground voltage VSS2 from the driving controller 150 shown in FIG. 1. A first driving stage SRC1 and the dummy driving stage SRCn+1 further receive a start signal STV as, for example, SRC1 does not receive a carry signal CR. In the present exemplary embodiment, the driving stages SRC1 to SRCn are respectively connected to the gate lines GL1 to GLn. The driving stages SRC1 to SRCn respectively provide gate signals G1 to Gn to the gate lines GL1 to GLn. In the present exemplary embodiment, the gate lines connected to the driving stages SRC1 to SRCn may be the odd-numbered gate lines or the even-numbered gate lines of the gate lines GL1 to GLn.

With continued reference to FIG. 7, each of the driving stages SRC1 to SRCn and the dummy driving stage SRCn+1 includes a first input terminal IN1, a second input terminal IN2, a gate output terminal OUT, a carry output terminal CR, a clock terminal CK, a first ground terminal V1, and a second ground terminal V2.

The gate output terminal OUT of each of the driving stages SRC1 to SRCn is connected to a corresponding gate line of the gate lines GL1 to GLn. The gate signals generated from the driving stages SRC1 to SRCn are provided respectively to the gate lines GL1 to GLn through the gate output terminals OUT.

The carry output terminal CR of each of the driving stages SRC1 to SRCn is electrically connected to the first input terminal IN1 of a next driving stage in the cascaded arrangement of driving stages. In addition, the carry output terminal CR of each of the driving stages SRC2 to SRCn is electrically connected to the second input terminal IN2 of a previous driving stage. For instance, the carry output terminal CR of a k-th driving stage of the driving stages SRC1 to SRCn is connected to the second input terminal IN2 of a (k−1)th driving stage and the first input terminal IN1 of a (k+1)th driving stage). The carry output terminal CR of each of the driving stages SRC1 to SRCn and the dummy driving stage SRCn+1 outputs the carry signal.

The first input terminal IN1 of each of the driving stages SRC2 to SRCn and the dummy driving stage SRCn+1 receives the carry signal of the previous driving stage. For instance, the first input terminal IN1 of the k-th driving stage SRCk receives a carry signal CRk−1 of the (k−1)th driving stage SRCk−1. The first input terminal IN1 of the first driving stage SRC1 of the driving stages SRC1 to SRCn receives a vertical start signal STV from the driving controller 150 shown in FIG. 1 instead of receiving the carry signal.

The second input terminal IN2 of each of the driving stages SRC1 to SRCn receives the carry signal from the carry output terminal CR of the next driving stage in the sequence. For instance, the second input terminal IN2 of the k-th driving stage SRCk receives a carry signal CRk+1 output from the carry output terminal CR of the (k+1)th driving stage SRCk+1. According to another exemplary embodiment of the present inventive concept, the second input terminal IN2 of each of the driving stages SRC1 to SRCn may be electrically connected to the gate output terminal OUT of the next driving stage. The second input terminal IN2 of the last driving stage SRCn receives a carry signal CRn+1 output from the carry output terminal CR of the dummy driving stage SRCn+1.

The clock terminal CK of each of the driving stages SRC1 to SRCn receives either the first clock signal CKV or the second clock signal CKVB. In this example, the clock terminal CK of the odd-numbered driving stages SRC1, SRC3, SRCn−1 of the driving stages SRC1 to SRCn receives the first clock signal CKV. The clock terminal CK of the even-numbered driving stages SRC2, SRC4, SRCn of the driving stages SRC1 to SRCn receives the second clock signal CKVB. The first clock signal CKV and the second clock signal CKVB have different phases from each other.

The first ground terminal V1 of each of the driving stages SRC1 to SRCn receives the first ground voltage VSS1. The second ground terminal V2 of each of the driving stages SRC1 to SRCn receives the second ground voltage VSS2. The first ground voltage VSS1 has a different voltage level from that of the second ground voltage VSS2, and the second ground voltage VSS2 has a voltage level lower than the first ground voltage VSS1.

In the present exemplary embodiment, it should be appreciated that at least one of the first input terminal IN1, the second input terminal IN2, the gate output terminal OUT, the carry output terminal CR, the clock terminal CK, the first ground terminal V1, and the second ground terminal V2 may be omitted from each of the driving stages SRC1 to SRCn, or each of the driving stages SRC1 to SRCn may further include other terminals. For instance, one of the first ground terminal V1 and the second ground terminal V2 may be omitted. In this case, each of the driving stages SRC1 to SRCn receives only one of the first ground voltage VSS1 and the second ground voltage VSS2. Also, the connection relation between the driving stages SRC1 to SRCn may be changed. The driving stages are shown to facilitate understanding of the inventive concept, and a person of ordinary skill in the art should understand that the arrangement is not limited to the example shown in FIG. 7.

Figure 8:
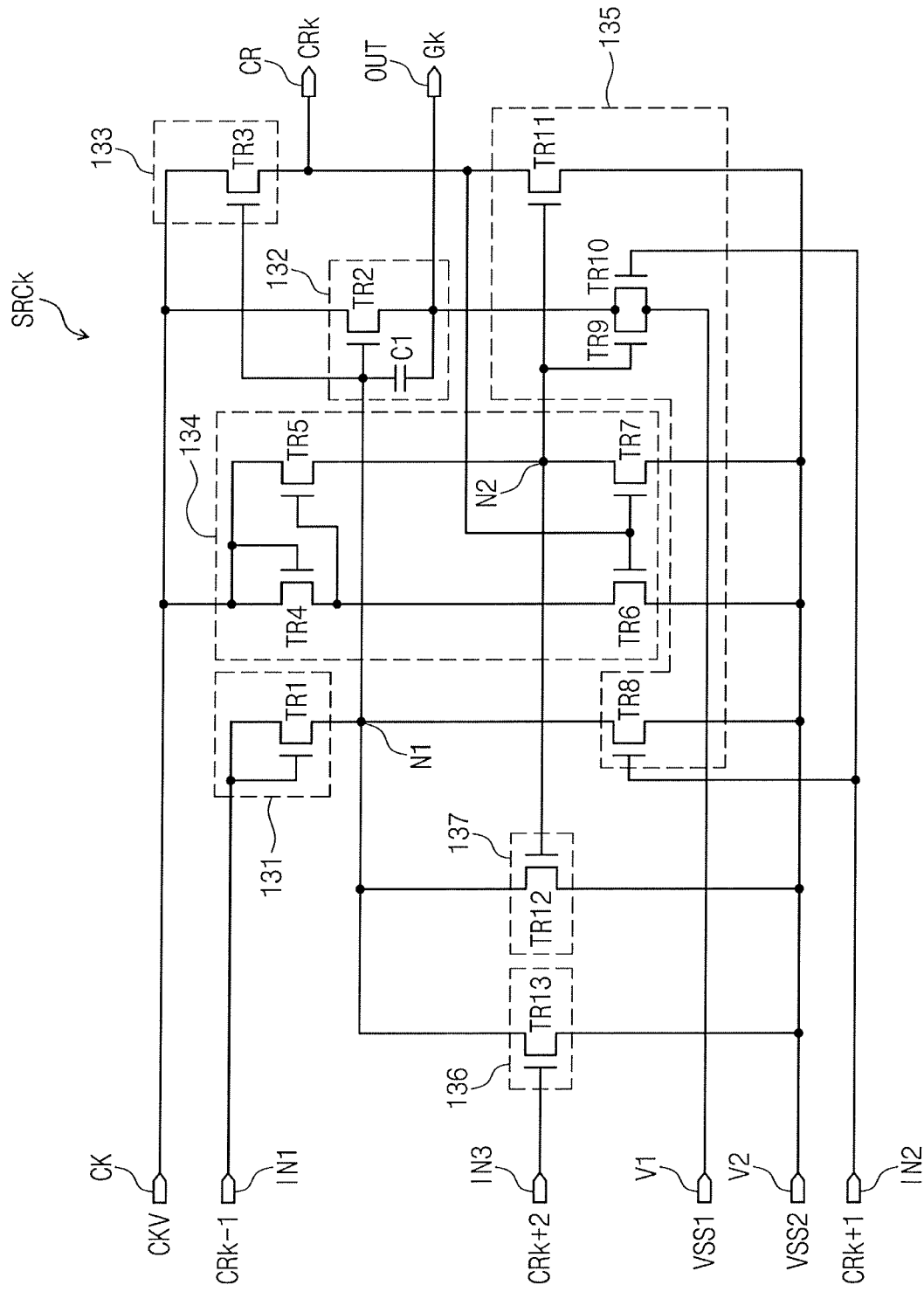
FIG. 8 is a circuit diagram of a driving stage according to an exemplary embodiment of the present disclosure.

FIG. 8 is a circuit diagram of the driving stage according to an exemplary embodiment of the present inventive concept.

FIG. 8 shows the k-th driving stage SRCk (k is an integer number greater than 1) among the driving stages SRC1 to SRCn as a representative example. For this example, a person or ordinary skill in the art should appreciate that each of the driving stages SRC1 to SRCn shown in FIG. 7 has the same circuit configuration as that of the k-th driving stage SRCk. The k-th driving stage SRCk shown in FIG. 8 receives the first clock signal CKV, however, the k-th driving stage SRCk may receive the second clock signal CKVB instead of the first clock signal CKV.

Referring now to FIG. 8, the k-th driving stage SRCk includes an input circuit 131, a first output circuit 132, a second output circuit 133, a discharge hold circuit 134, a discharge circuit 135, a first pull-down circuit 136, and a second pull-down circuit 137.

The input circuit 131 receives the (k−1)th carry signal CRk−1 from the (k−1)th driving stage SRCk−1 and precharges a first node N1. The first output circuit 132 outputs the first clock signal CKV as a k-th gate signal Gk in response to a signal of the first node N1. The second output circuit 133 outputs the first clock signal CKV as a k-th carry signal CRk in response to the signal of the first node N1.

Figure 9:
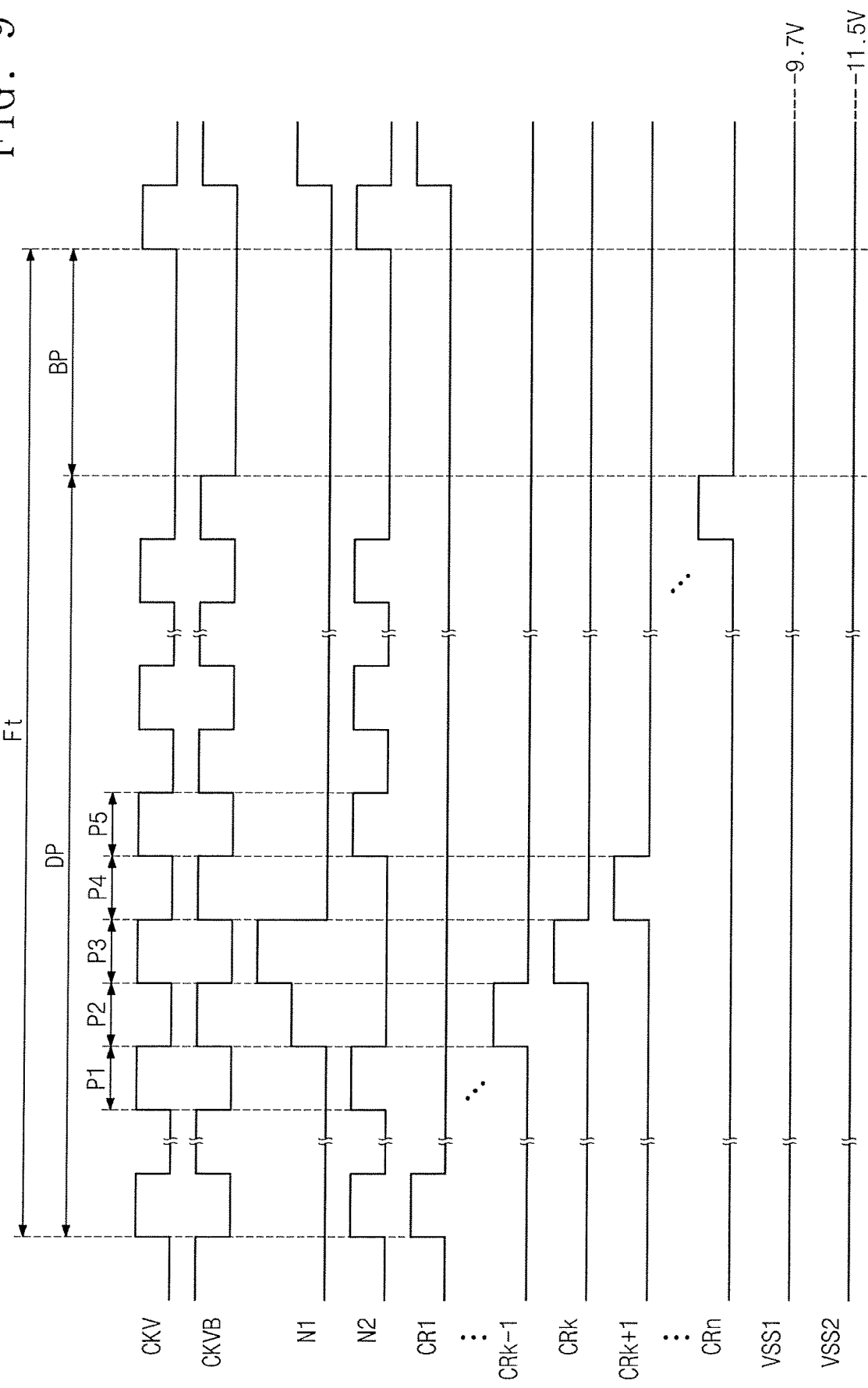
FIG. 9 is a timing diagram showing an operation of the driving stage of FIG. 8.

The discharge hold circuit 134 transmits the first clock signal CKV to a second node N2 in response to the first clock signal CKV and discharges the second node N2 to the second ground voltage VSS2 in response to the k-th carry signal CRk. As disclosed herein, the second ground voltage VSS2 has a lower value than a first ground voltage VSS1. For example, FIG. 9 shows a VSS2 value of −11.5 V, which is lower than the first ground voltage value of −9.7V.

The first pull-down circuit 136 discharges the first node N1 to the second ground voltage VSS2 in response to a (k+2)th carry signal CRk+2 from a (k+2)th driving stage SRCk+2. The second pull-down circuit 137 discharges the first node N1 to the second ground voltage VSS2 in response to receiving a signal of the second node N2. The discharge circuit 135 discharges the k-th gate signal Gk to the first ground voltage VSS1 in response to the signal of the second node N2 and the (k+1)th carry signal CRk+1 of the (k+1)th driving stage SRCk+1 and discharges the first node N1 and the k-th carry signal CRk to the second ground voltage VSS2.

Hereinafter, configurations of the input circuit 131, the first output circuit 132, the second output circuit 133, the discharge hold circuit 134, the discharge circuit 135, the first pull-down circuit 136, and the second pull-down circuit 137 will be described in detail herein below. Each of the aforementioned circuits is shown within its own dashed box to facilitate visualizing the various circuits.

With continued reference to FIG. 8, the input circuit 131 may include an input transistor TR1. The input transistor TR1 includes a first electrode connected to the first input terminal IN1 receiving the (k−1)th carry signal CRk−1 from the (k−1)th driving stage SRCk−1, a second electrode connected to the first node N1, and a gate electrode connected to the first input terminal IN1.

The first output circuit 132 may include a first output transistor TR2 and a capacitor C1. The first output transistor TR2 includes a first electrode connected to the clock terminal CK receiving the first clock signal CKV, a second electrode connected to the gate output terminal OUT outputting the k-th gate signal Gk, and a gate electrode connected to the first node N1. The capacitor C1 is connected between the first node N1 and the gate output terminal OUT.

The second output circuit 133 includes a second output transistor TR3. The second output transistor TR3 includes a first electrode connected to the clock terminal CK, a second electrode connected to the carry output terminal CR outputting the k-th carry signal CRk, and a gate electrode connected to the first node N1.

The discharge hold circuit 134 includes a construction of first, second, third, and fourth hold transistors TR4, TR5, TR6, and TR7. The first hold transistor TR4 includes a first electrode connected to the clock terminal CK, a second electrode and a gate electrode connected to the clock terminal CK. The second hold transistor TR5 includes a first electrode connected to the clock terminal CK, a second electrode connected to the second node N2, and a gate electrode connected to the second electrode of the first hold transistor TR4.

The third hold transistor TR6 includes a first electrode connected to the second electrode of the first hold transistor TR4, a second electrode connected to the second ground terminal V2 receiving the second ground voltage VSS2, and a gate electrode connected to the carry output terminal CR outputting the k-th carry signal CRk. The fourth hold transistor TR7 includes a first electrode connected to the second node N2, a second electrode connected to the second ground terminal V2, and a gate electrode connected to the carry output terminal CR.

The discharge circuit 135 includes, for example, first, second, third, and fourth discharge transistors TR8, TR9, TR10, and TR11. The first discharge transistor TR8 includes a first electrode connected to the first node N1, a second electrode connected to the second ground terminal V2, and a gate electrode connected to the second input terminal IN2. The second discharge transistor TR9 includes a first electrode connected to the gate output terminal OUT, a second electrode connected to the first ground terminal V1 receiving the first ground voltage VSS1, and a gate electrode connected to the second node N2. The third discharge transistor TR10 includes a first electrode connected to the gate output terminal OUT, the second electrode connected to the first ground terminal V1, and a gate electrode connected to the second input terminal IN2 receiving the (k+1)th carry signal CRk+1 of the (k+1)th driving stage SRCk+1. The fourth discharge transistor TR11 includes a first electrode connected to the catty output terminal CR, a second electrode connected to the second ground terminal V2, and a gate electrode connected to the second node N2.

The first pull-down circuit 136 includes a first pull-down transistor TR13. The first pull-down transistor TR13 includes a first electrode connected to the first node N1, a second electrode connected to the second ground terminal V2, and a gate electrode connected to a third input node IN3.

The second pull-down circuit 137 includes a second pull-down transistor TR12. The second pull-down transistor TR12 includes a first electrode connected to the first node N1, a second electrode connected to the second ground terminal V2, and a gate electrode connected to the second node N2.

FIG. 9 is a timing diagram showing an operation of the driving stage of FIG. 8.

Referring now to FIGS. 8 and 9, one frame period Ft includes the display period DP and the blank period BP. The first clock signal CKV and the second clock signal CKVB are pulse signals that are periodically transited to a high level or a low level during the display period DP. The first clock signal CKV and the second clock signal CKVB are complementary signals with each other.

In FIG. 8, the operation of the k-th driving stage SRCk will be described based on an output timing of the k-th carry signal CRk. The first clock signal CKV is transited to the high level in a first period P1. In a second period P2, the first clock signal CKV is transited to the low level, and the (k−1)th carry signal CRk−1 is transited to the high level. For example, when the input transistor TR1 is turned on in response to the (k−1)th carry signal CRk−1 at the high level, the first node N1 is pre-charged to a predetermined voltage level corresponding to the (k−1)th carry signal CRk−1.

When the first clock signal CKV shown in FIG. 8 is transited to the high level in a third period P3, the first output transistor TR2 is turned on. Accordingly, a signal level of the first node N1 is boosted up by the first capacitor C1, and the k-th gate signal Gk output to the gate output terminal OUT is transited to the high level. Meanwhile, when the first clock signal CKV is transited to the high level, the second output transistor TR3 is turned on, and thus the k-th carry signal CRk that is output to the carry output terminal CR is transited to the high level. In this case, the third hold transistor TR6 and the fourth hold transistor TR7 are turned on by the k-th carry signal CRk at the high level, and thus the second node N2 is maintained at the level of the second ground voltage VSS2.

In a fourth period P4, when the first clock signal CKV is transited to the low level, the first output transistor TR2 and the second output transistor TR3 shown in FIG. 8 are turned off. Then, when the (k+1)th carry signal CRk+1 from the (k+1)th driving stage SRCk+1 is transited to the high level, the first discharge transistor TR8 and the third discharge transistor TR10 are turned on. Thus, the first node N1 and the k-th carry signal CRk are discharged to the second ground voltage VSS2, and the k-th gate signal Gk is discharged to the first ground voltage VSS1.

In a fifth period P5, the first hold transistor TR4 and the second hold transistor TR5, which are included in the discharge hold circuit 134, are turned on when the first clock signal CKV is transited to the high level, and the first clock signal CKV at a high level is provided to the second node N2. Since the second pull-down transistor TR9 and the fourth pull-down transistor TR11 are turned on while the second node N2 is maintained at the high level, the k-th gate signal Gk is maintained at the first ground voltage VSS1, and the k-th carry signal CRk is maintained at the second ground voltage VSS2.

The fourth period P4 and the fifth period P5 shown in FIG. 9 are repeated so the k-th gate signal Gk and the k-th carry signal CRk may be maintained at the low level until the k-th gate signal Gk and the k-th carry signal CRk are transited again to the high level in a next frame period Ft+1 shown in FIG. 2 after the k-th gate signal Gk and the k-th carry signal CRk are transited to the low level from the high level in the frame period Ft shown in FIG. 2.

With regard to the ground voltages, the first ground voltage VSS1 has a voltage level different from that of the second ground voltage VSS2, and the second ground voltage VSS2 may have a voltage level lower than a normal level of the first ground voltage VSS1. For instance, the normal level of the first ground voltage VSS1 is about −9.7 volts, and a normal level of the second ground voltage VSS2 is about −11.5 volts.

During the frame period Ft, the first ground voltage VSS1 and the second ground voltage VSS2 may be maintained at a constant level. According to the present exemplary embodiment, the display device may change the voltage level of the first ground voltage VSS1 to a voltage level higher than the normal level thereof during the blank period BP. When the voltage level of the first ground voltage VSS1 increases during the blank period BP, the voltage level of the gate signal Gk increases. As the voltage level of the gate signal Gk increases, the pixel transistor TR of the pixel PXij shown in FIG. 3 is slightly turned on, which may allow an amount of leakage current in the pixel PXij to increase. According to another exemplary embodiment of the present disclosure, the display device may change the voltage level of the second ground voltage VSS2 to a voltage level higher than the normal level thereof during the blank period BP.

The first clock signal CKV and the second clock signal CKVB are maintained at the low level during the blank period BP. In the display device according to another exemplary embodiment of the present inventive concept, the first clock signal CKV and the second clock signal CKVB are transited to the high level in a certain period of time during the blank period BP. When the first clock signal CKV and the second clock signal CKVB are transited to the high level, a drain-source voltage Vds of the first output transistor TR2 increases, and a current flows through between a drain terminal and a source terminal of the first output transistor TR2. When the current flows through between the drain terminal and the source terminal of the first output transistor TR2, a voltage of a source terminal of the first output transistor TR2 increases, and thus the voltage level of the gate signal Gk increases. Therefore, the pixel transistor TR of the pixel PXij shown in FIG. 3 is slightly turned on to allow the amount of the leakage current to increase. The increase in the amount of leakage current may cause a flicker of the image shown by the display.

Figure 10:
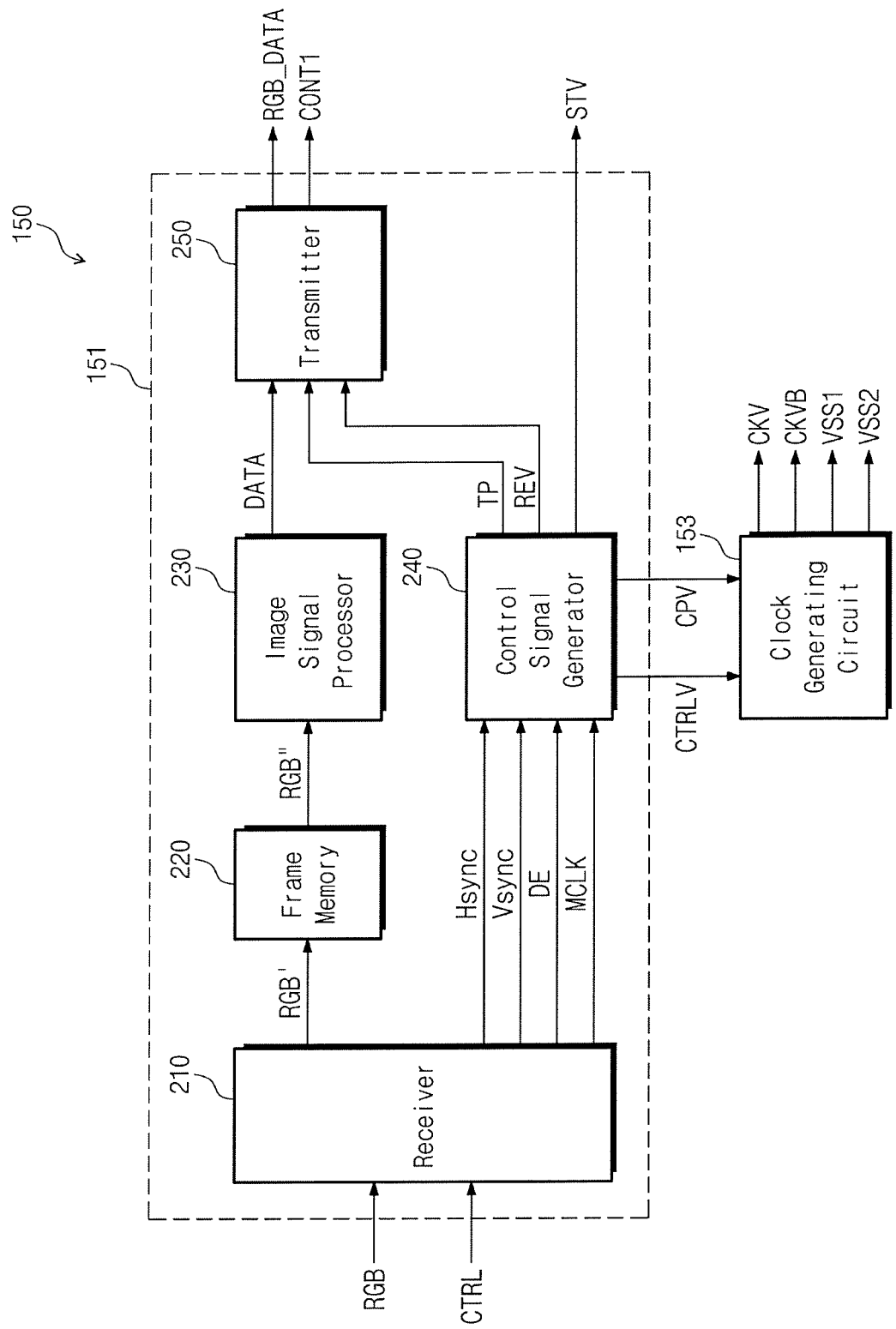
FIG. 10 is a block diagram showing a driving controller according to an exemplary embodiment of the present disclosure.

FIG. 10 is a block diagram showing the driving controller according to an exemplary embodiment of the present inventive concept.

Referring to FIG. 10, the driving controller 150 includes a controller 151 and may include or communicate with a clock generating circuit 153. Responsive to the image signal RGB and the control signal CRTL received from the external source, the driving controller 150 outputs a control signal CONT1 and a data voltage signal RGB_DATA to control the data driving circuit 140 shown in FIG. 1 and outputs the first clock signal CKV, the second clock signal CKVB, and a driving voltage, which are applied to the gate driving circuit 130. The driving voltage includes the first ground voltage VSS1 and the second ground voltage VSS2. The driving controller 150 restores a data enable signal DE having the display period and the blank period in one frame on the basis of the control signal CTRL and sets a voltage level of the driving voltage applied to the gate driving circuit 130 in accordance with a duration of the blank period. Hereinafter, the driving controller 150 that changes the voltage level of the first ground voltage VSS1 applied to the gate driving circuit 130 in accordance with the duration of the blank period of the data enable signal DE will be described.

The controller 151 may include a receiver 210, a frame memory 220, an image signal processor 230, a control signal generator 240, and a transmitter 250. The receiver 210 restores the control signal CTRL to the data enable signal DE. The receiver 210 may further restore the horizontal synchronization signal Hsync, the vertical synchronization signal Vsync, and a main clock signal MCLK on the basis of the control signal CTRL sent to the receiver 210.

The frame memory 220 delays an image signal RGB' output from the receiver 210 from being provided to the image signal processor 230 by one frame and outputs the delayed image signal RGB". The image signal processor 230, which may include integrated circuitry configured for operation, converts the delayed image signal RGB" to the data signal DATA and outputs the data signal DATA. The image signal processor 230 may output the data signal DATA after linearizing the image signal RGB" such that gamma characteristics of the image signal RGB" are proportional to brightness.

As shown in FIG. 10, the control signal generator 240 receives the horizontal synchronization signal Hsync, the vertical synchronization signal Vsync, the data enable signal DE, and the main clock signal MCLK and outputs a line latch signal TP, a reverse signal REV, a start signal STV that is provided, for example to the driving stages SRC1 to SRCn shown in FIG. 7 to IN1, and SRCn+1 and SRCn+2 to IN3, a voltage level control signal CTRLV, and a clock pulse signal CPV. The transmitter 250 outputs the data signal DATA as a data voltage signal RGB_DATA and outputs the line latch signal TP and the reverse signal as a control signal CONT1. The data signal DATA and the control signal CONT1 are provided to the data driving circuit 140 shown in FIG. 1.

As an example, the image signal RGB and the control signal CTRL provided from the external source may be applied to the receiver 210 by a low voltage differential signaling (LVDS) operation. The transmitter 250 may output the data signal DATA and the control signal CONT1, which are converted by a reduced signal differential signaling (RSDS) operation.

The clock generating circuit 153 receives the clock pulse signal CPV and the voltage level control signal CTRLV from the control signal generator 240 and generates the first clock signal CKV, the second clock signal CKVB, the first ground voltage VSS1, and the second ground voltage VSS2. The clock generating circuit 153 outputs the first clock signal CKV and the second clock signal CKVB, which correspond to the clock pulse signal CPV, and generates the first ground voltage VSS1 having a voltage level corresponding to the voltage level control signal CTRLV.

Figure 11:
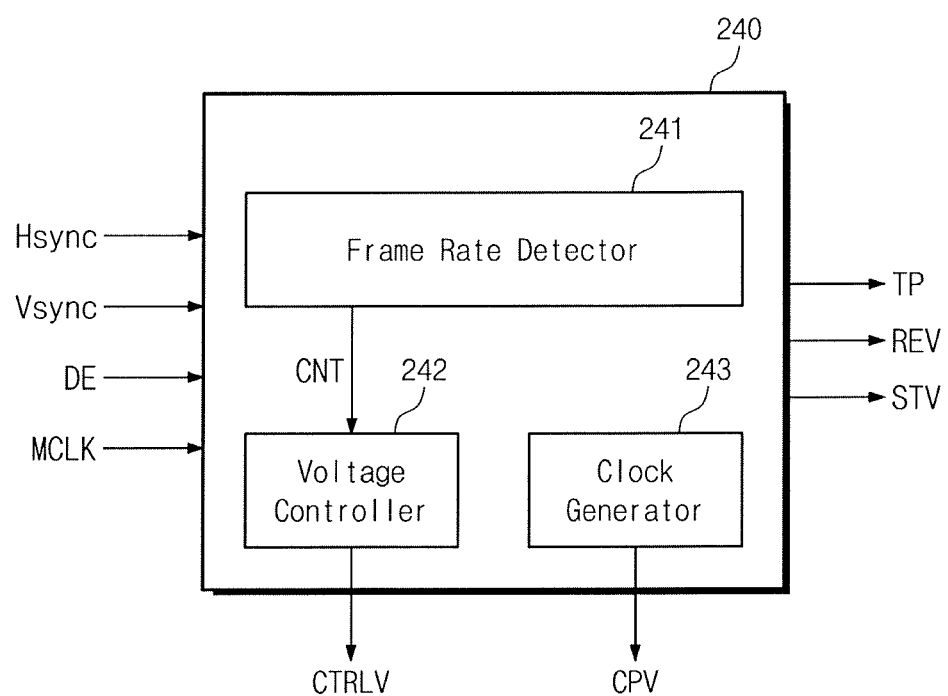
FIG. 11 is a block diagram showing a control signal generator according to an exemplary embodiment of the present disclosure.

FIG. 11 is a block diagram showing the control signal generator 240 according to an exemplary embodiment of the present inventive concept.

Referring to FIG. 11, the control signal generator 240 may include a frame rate detector 241 detecting a frame rate on the basis of the display period and the blank period of the data enable signal DE, a voltage controller 242 outputting the voltage level control signal CTRLV corresponding to the detected frame rate, and a clock generator 243 generating the clock pulse signal CPV in response to receipt of the data enable signal DE and the main clock signal MCLK.

Figure 12:
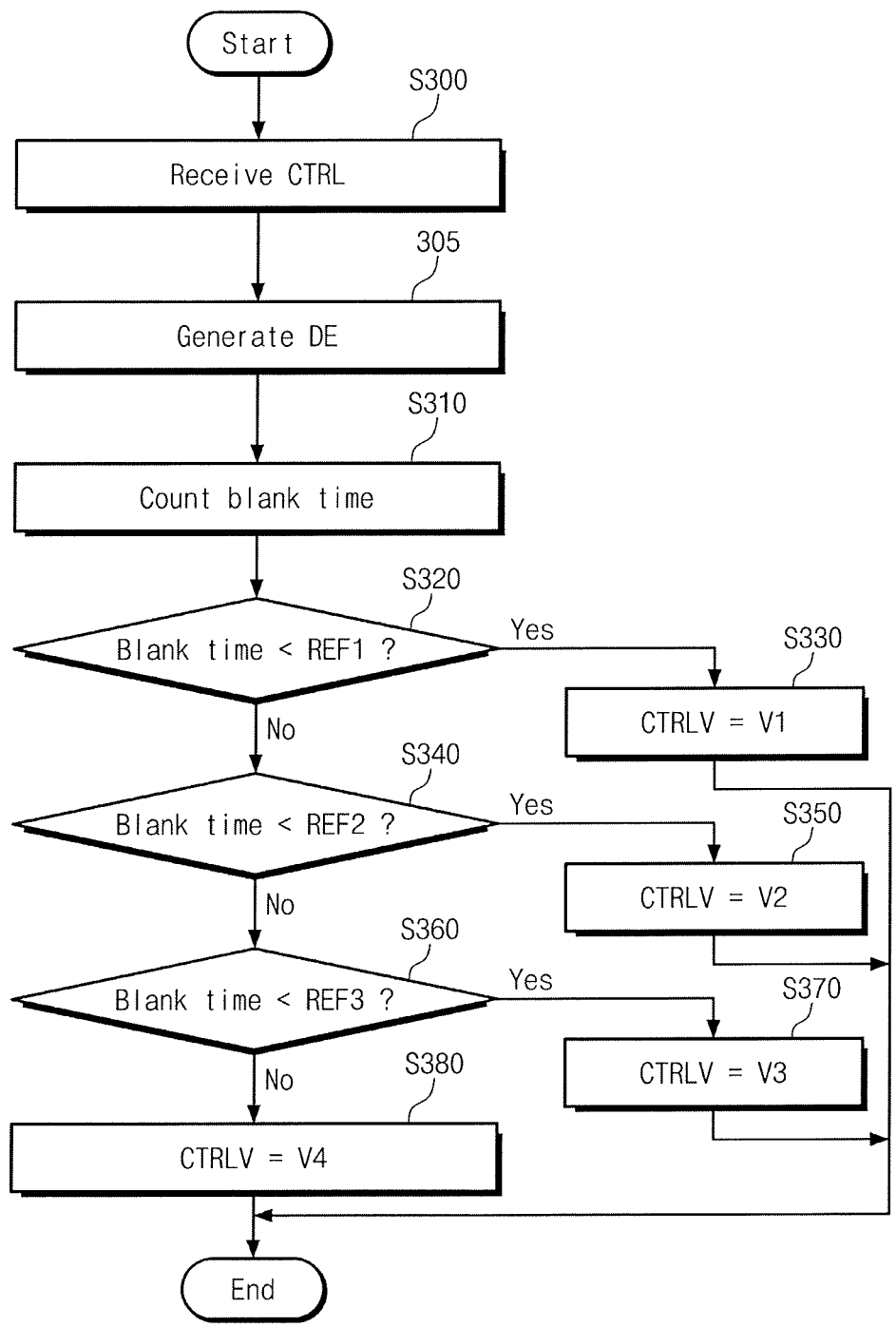
FIG. 12 is a flowchart showing a method of driving a display device according to an exemplary embodiment of the inventive concept.
Figure 13:
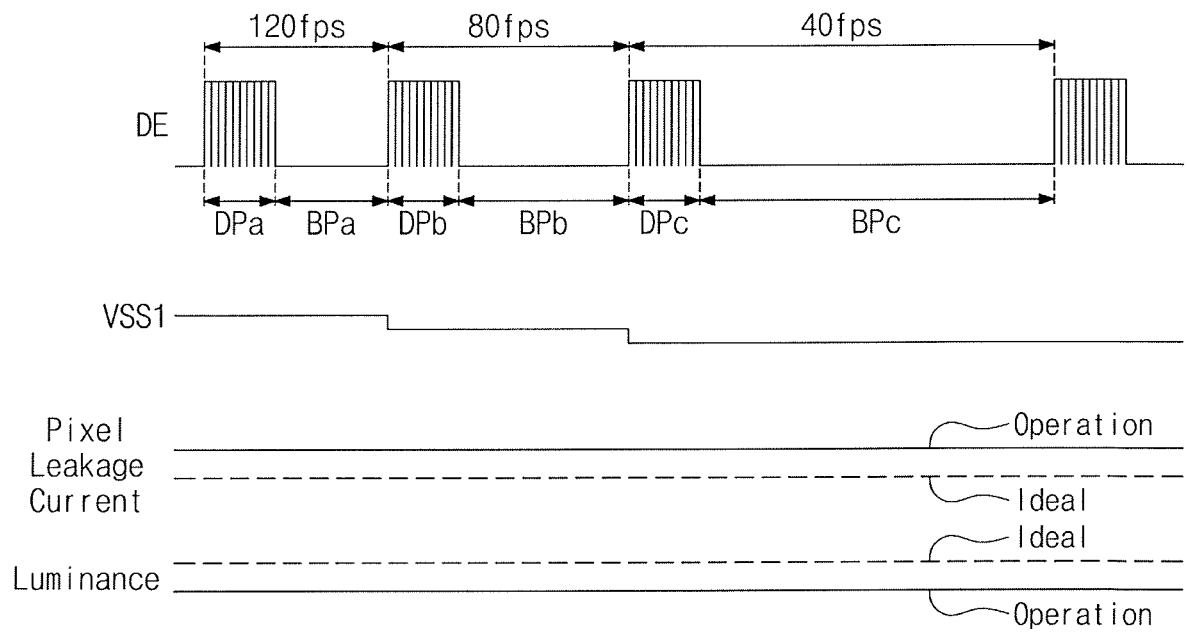
FIG. 13 is a timing diagram showing a variation in a first ground voltage in accordance with a frame rate.

FIG. 12 is a flowchart illustrating a method of driving a display device according to an exemplary embodiment of the present inventive concept. FIG. 13 is a timing diagram showing a variation in the first ground voltage in accordance with the frame rate.

Referring to FIGS. 10, 11, 12, and 13, at (S300) the receiver 210 receives the control signal CTRL from the external source. At (S305), the receiver 210 restores/generates the data enable signal DE on the basis of the control signal CTRL.

The restored data enable signal DE includes a display period DPx and a blank period BPx in one frame. The duration of the blank period is based on the frame rate of the display period, with for example, a relatively larger frame rate in fps having a relatively shorter duration of the blank period. The frame rate detector 241 of the control signal generator 240 receives the data enable signal DE from the receiver 210.

At (S310), the frame rate detector 241 identifies the display period DPx and the blank period BPx of the data enable signal DE and counts a time of the blank period BPx. For example, the frame rate detector 241 counts a pulse of the main clock signal MCLK during the blank period BPx of the data enable signal DE to calculate the time of the blank period BPx. The frame rate detector 241 provides a count signal CNT to the voltage controller 242. The count signal CNT indicates the duration of the blank period BPx. The frame rate detector 241 may sense the frame rate by counting the time of the blank period BPx of the data enable signal DE.

If the duration CNT of the blank period BPx is detected to be shorter than a first reference value REF1 (S320), then the voltage controller 242 sets the voltage level control signal CTLRV to a first level V1 (S330).

If the duration CNT of the blank period BPx is detected to be shorter than a second reference value REF2 (S340), then the voltage controller 242 sets the voltage level control signal CTLRV to a second level V2 (S350).

If the duration CNT of the blank period BPx is detected to be shorter than a third reference value REF3 (S360), then the voltage controller 242 sets the voltage level control signal CTLRV to a third level V3 (S370).

However, if the duration CNT of the blank period BPx is detected to be equal to or greater than the third reference value REF3 (S360), the voltage controller 242 sets the voltage level control signal CTLRV to a fourth level V4 (S380).

In the present exemplary embodiment, the first reference value REF1, the second reference value REF2, and the third reference value REF3 satisfy the following inequalities of the first reference value REF1<the second reference value REF2<the third reference value REF3, and the first level V1, the second level V2, the third level V3, and the fourth level V4 satisfy the following inequalities of the first level V1>the second level V2>the third level V3>the fourth level V4.

The clock generating circuit 153 shown in FIG. 10 sets the voltage level of the first ground voltage VSS1 in response to the voltage level control signal CTLRV.

As shown in FIG. 13, as the duration of the blank period BPx decreases, the voltage level of the first ground voltage VSS1 becomes high, and as the duration of the blank period BPx increases, the voltage level of the first ground voltage VSS1 becomes low. As a result, the value of pixel leakage current remains at a substantially stable level. For instance, the duration of the blank period BPa when the frame rate is about 120 fps is shorter than the duration of the blank period BPb when the frame rate is about 80 fps. In addition, the duration of the blank period BPb when the frame rate is about 80 fps is shorter than the duration of the blank period BPc when the frame rate is about 40 fps. Therefore, the voltage level of the first ground voltage VSS1 is the highest when the frame rate is about 120 fps, and the voltage level of the first ground voltage VSS1 is the lowest when the frame rate is about 40 fps. The different values of VSS1, based on the blank period, may reduce or prevent the effects of leakage current of the pixels, as variations in brightness caused by different leakage values may cause a flicker of the display.

As previously discussed with reference to FIG. 6, in that particular example, the amount of leakage current is the greatest when the frame rate is about 40 fps. However, if the amount of leakage can be maintained to be substantially constant as the frame rate changes, the user may not recognize flicker. Thus, the amount of leakage current when the frame rate is about 120 fps may be increased by setting the voltage level of the first ground voltage VSS1 when the frame rate is about 120 fps to be higher than the level of VSS1 when the frame rate is about 40 fps. In addition, the amount of leakage current when the frame rate is about 80 fps may be increased by setting the voltage level of the first ground voltage VSS1 when the frame rate is about 80 fps to be higher than that the level of VSS1 when the frame rate is about 40 fps.

According to the inventive concept, the amount of leakage current in the pixel PXij is maintained at a substantially constant amount when the voltage level of the first ground voltage VSS1 is set to be different in accordance with the various frame rates of, for example, about 120 fps, about 80 fps, and about 40 fps. Thus, a brightness difference may not occur even though the frame rate is changed. The inventive concept is not limited to the aforementioned changes in fps, and may be applied to other variations in fps than about 120 fps, about 80 pfs, and about 40 fps.

Figure 14:
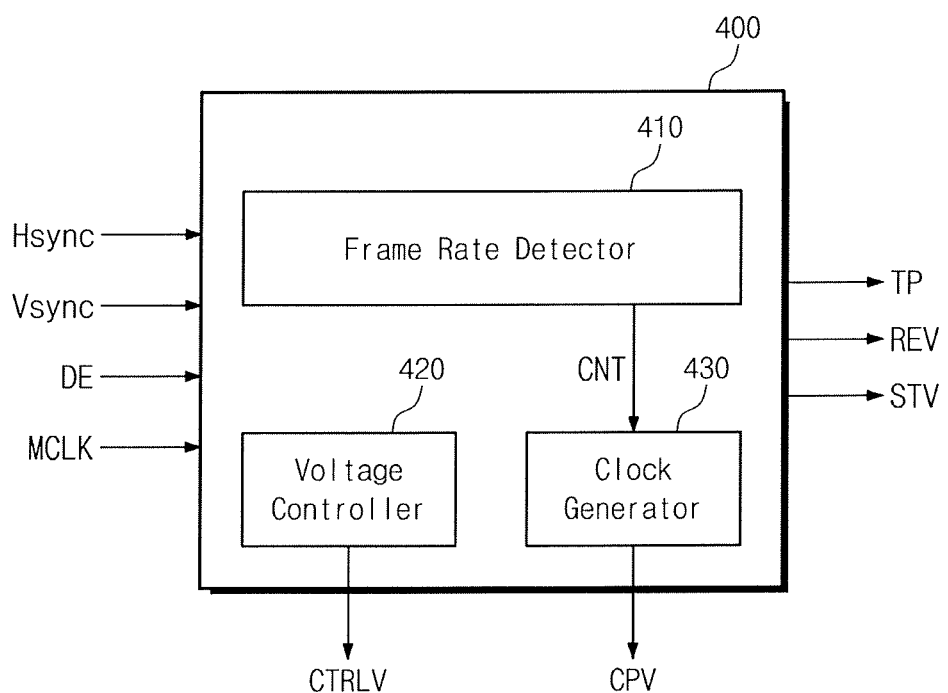
FIG. 14 is a block diagram showing a control signal generator according to another exemplary embodiment of the inventive concept.

FIG. 14 is a block diagram showing a control signal generator 400 according to another exemplary embodiment of the present disclosure.

Referring to FIG. 14, the control signal generator 400 includes a frame rate detector 410 detecting a frame rate on the basis of a display period and a blank period of a data enable signal DE, a voltage controller 420 outputting a voltage control signal CTRLV, and a clock generator 430 generating a clock pulse signal CPV in response to the data enable signal DE, a main clock signal MCLK, and a count signal CNT, which is provided from the frame rate detector 410.

Figure 15:
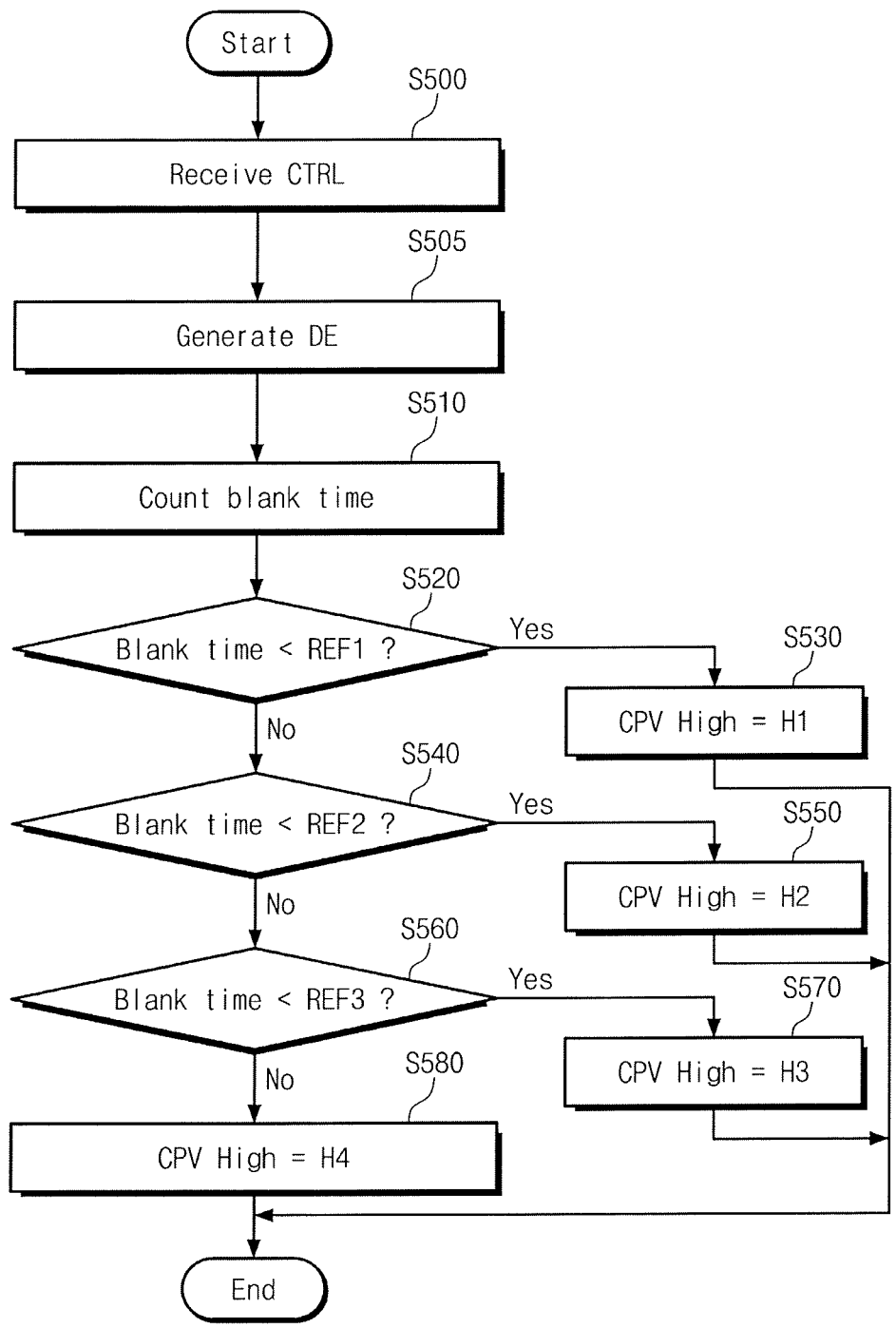
FIG. 15 is a flowchart showing a method of driving the display device according to another exemplary embodiment of the inventive concept.
Figure 16:
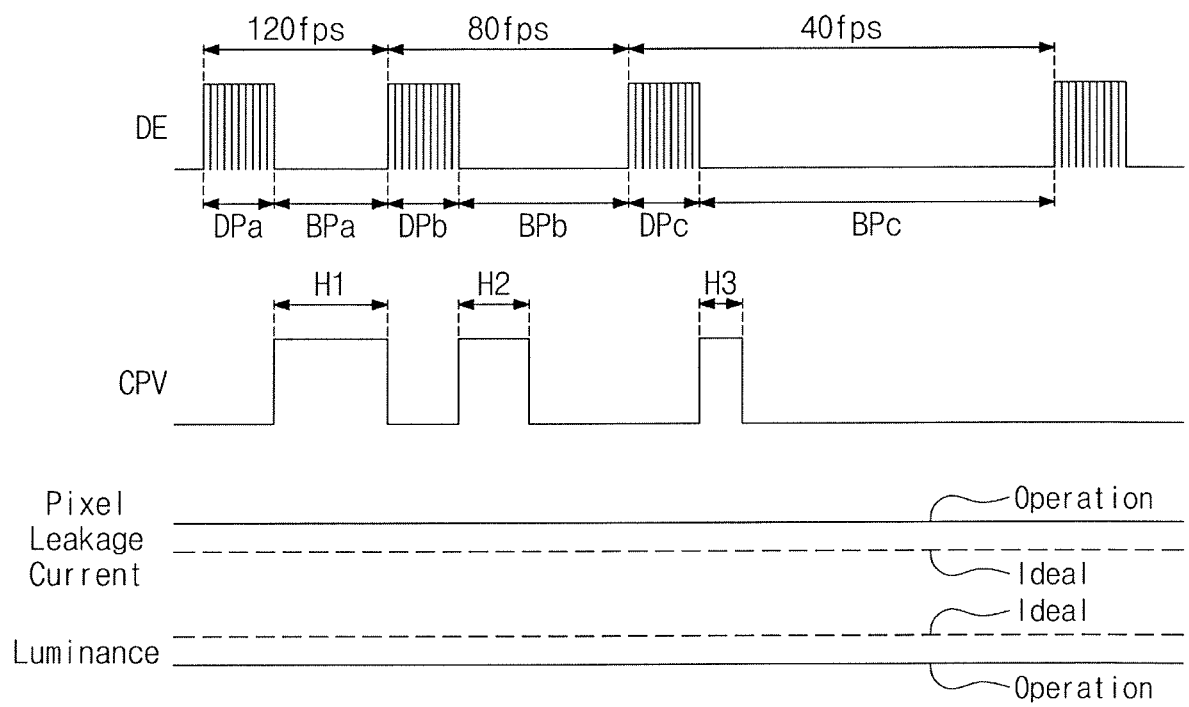
FIG. 16 is a timing diagram showing a variation in a clock pulse signal in accordance with a frame rate.

FIG. 15 is a flowchart illustrating a method of driving the display device according to another exemplary embodiment of the present disclosure. FIG. 16 is a timing diagram showing a variation in the clock pulse signal in accordance with the frame rate.

Referring now to FIGS. 10, 14, 15, and 16, the receiver 210 of the driving controller 150 receives the control signal CTRL from the external source (S500). The receiver 210 restores the data enable signal DE on the basis of the control signal CTRL (S505).

The restored data enable signal DE may include a display period DPx and a blank period BPx in one frame. The frame rate detector 410 of the control signal generator 440 shown in FIG. 14 receives the data enable signal DE from the receiver 210.

The frame rate detector 410 identifies the display period DPx and the blank period BPx of the data enable signal DE and counts a time of the blank period BPx (S510). For example, the frame rate detector 410 counts a pulse of the main clock signal MCLK during the blank period BPx of the data enable signal DE to calculate the time of the blank period BPx. The frame rate detector 410 provides the count signal CNT to the clock generator 430. The count signal CNT indicates a duration of the blank period BPx. The frame rate detector 410 may sense the frame rate by counting the time of the blank period BPx of the data enable signal DE.

In a case where the duration CNT of the blank period BPx counted by the frame rate detector is detected to be shorter than a first reference value REF1 (S520), the clock generator 430 sets a pulse width of the clock pulse signal CPV to a first time value H1 during the blank period BPx (S530).

In a case where the duration CNT of the blank period BPx counted by the frame rate detector is detected to be shorter than a second reference value REF2 (S540), the clock generator 430 sets the pulse width of the clock pulse signal CPV to a second time value H2 (S550) during the blank period BPx.

In a case where the duration CNT of the blank period BPx counted by the frame rate detector is detected to be shorter than a third reference value REF3 (S560), the clock generator 430 sets the pulse width of the clock pulse signal CPV to a third time H3 (S570) during the blank period BPx.

In a case where the duration CNT of the blank period BPx counted by the frame rate detector is detected to be equal to or greater than the third reference value REF3 (S560), the clock generator 430 sets the pulse width of the clock pulse signal CPV to a fourth time H4 (S580) during the blank period BPx.

For example, with regard to the first reference value REF1, the second reference value REF2, and the third reference value REF3 satisfy the following inequalities of the first reference value REF1<the second reference value REF2<the third reference value REF3 and the first time value H1, the second time value H2, the third time value H3, and the fourth time value H4 satisfy the following inequalities of the first time value H1>the second time value H2>the third time value H3>the fourth time value H4.

The clock generating circuit 153 shown in FIG. 10 generates the first clock signal CKV and the second clock signal CKVB in response to the clock pulse signal CPV.

As shown in FIG. 16, as the duration of the blank period BPx decreases, the pulse width of the clock pulse signal CPV during the blank period BPx becomes longer, and as the duration of the blank period BPx increases, the pulse width of the clock pulse signal CPV becomes shorter.

For example, the duration of the blank period BPa when the frame rate is about 120 fps is shorter than the duration of the blank period BPb when the frame rate is about 80 fps. In addition, the duration of the blank period BPb when the frame rate is about 80 fps is shorter than the duration of the blank period BPc when the frame rate is about 40 fps. Therefore, the pulse width of the clock pulse signal CPV is the greatest when the frame rate is about 120 fps, and the pulse width of the clock pulse signal CPV is the smallest when the frame rate is about 40 fps.

As described earlier with reference to FIG. 6, the amount of leakage current is the greatest when the frame rate is about 40 fps. As a result, the amount of leakage current when the frame rate is about 120 fps may increase by setting the pulse width of the clock pulse signal CPV when the frame rate is about 120 fps to be greater than that when the frame rate is about 40 fps. In addition, the amount of leakage current when the frame rate is about 80 fps may increase by setting the pulse width of the clock pulse signal CPV when the frame rate is about 80 fps to be greater than that when the frame rate is about 40 fps.

The amount of leakage current in the pixel PXij is maintained to be substantially constant when the pulse width of the clock pulse signal CPV is set to be different in accordance with the frame rate of about 120 fps, 80 fps, and 40 fps. Thus, the brightness difference may not occur even though the frame rate is changed.

Figure 17:
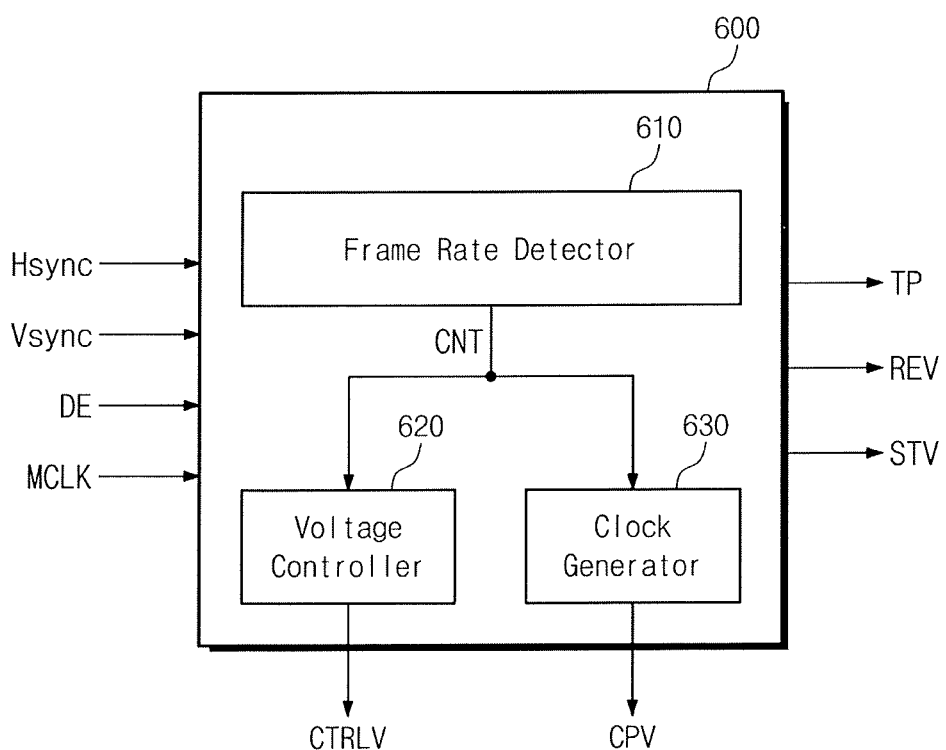
FIG. 17 is a block diagram showing a control signal generator according to another exemplary embodiment of the inventive concept.

FIG. 17 is a block diagram showing a control signal generator according to another exemplary embodiment of the present disclosure.

Referring now to FIG. 17, the control signal generator 600 includes a frame rate detector 610 detecting a frame rate on the basis of a display period and a blank period of a data enable signal DE, a voltage controller 620 outputting a voltage level control signal CTRLV in response to a count signal CNT from the frame rate detector 610, and a clock generator 630 generating a clock pulse signal CPV in response to the data enable signal DE, a main clock signal MCLK, and the count signal CNT from the frame rate detector 610. An artisan should appreciate that whereas in the embedment shown in FIG. 14 in which the count signal CNT is provided to the clock generator 430 from the frame rate detector 410, in the embodiment shown in FIG. 17, the count signal CNT is provided to both the voltage controller 620 and the clock generator 630.

Figure 18:
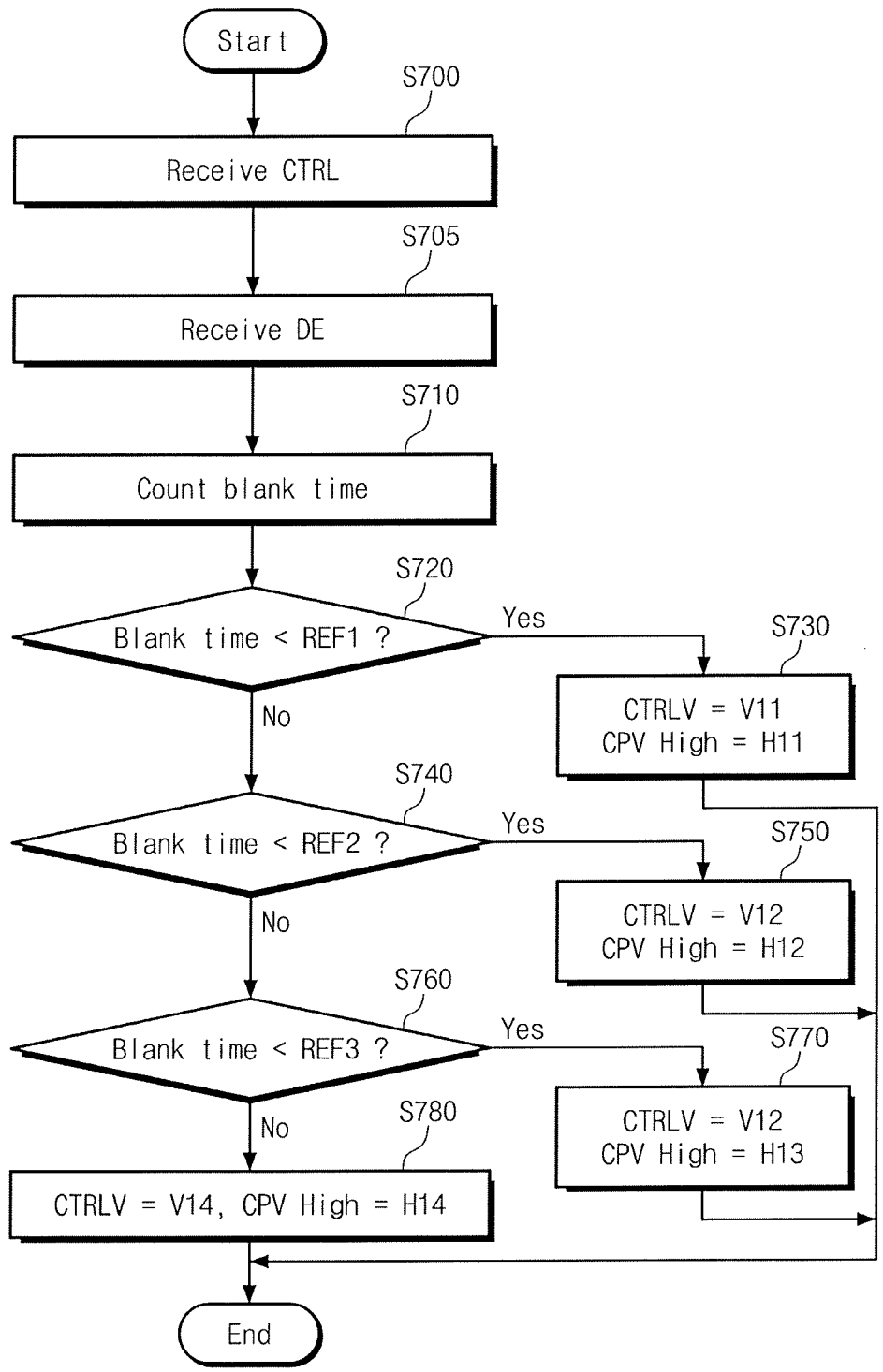
FIG. 18 is a flowchart showing a method of driving the display device according to an exemplary embodiment of the inventive concept.

FIG. 18 is a flowchart showing a method of driving the display device according to an exemplary embodiment of the present disclosure.

Referring to the arrangement shown in FIG. 10, the receiver 210 receives the control signal CTRL from the external source (S700). The receiver 210 restores the data enable signal DE on the basis of the control signal CTRL. The restored data enable signal DE includes a display period DPx and a blank period BPx in one frame.

Referring to FIGS. 17 and 18, the frame rate detector 610 of the control signal generator 600 receives the data enable signal DE from the receiver 210 (S705).

The frame rate detector 610 identifies the display period DPx and the blank period BPx of the data enable signal DE and counts a time of the blank period BPx (S710). For instance, the frame rate detector 610 counts a pulse of the main clock signal MCLK during the blank period BPx of the data enable signal DE to calculate the time of the blank period BPx. The frame rate detector 610 provides the count signal CNT to the voltage controller 620 and the clock generator 630. The count signal CNT is the same as a duration of the blank period BPx. The frame rate detector 610 may sense the frame rate by counting the time of the blank period BPx of the data enable signal DE.

In a case that the duration CNT of the blank period BPx is detected to be shorter than a first reference value REF1 (S720), the voltage controller 620 sets a voltage level control signal CTRLV to a first level V11 and the clock generator 630 sets a pulse width of the clock pulse signal CPV to a first time value H11 during the blank period BPx (S730).

In a case that the duration CNT of the blank period BPx is detected to be shorter than a second reference value REF2 (S740), the voltage controller 620 sets the voltage level control signal CTRLV to a second level V12 and the clock generator 630 sets the pulse width of the clock pulse signal CPV to a second time value H12 during the blank period BPx (S750).

In a case that the duration CNT of the blank period BPx is detected to be shorter than a third reference value REF3 (S760), the voltage controller 620 sets the voltage level control signal CTRLV to a third level V13 and the clock generator 630 sets the pulse width of the clock pulse signal CPV to a third time H13 during the blank period BPx (S770).

In a case that the duration CNT of the blank period BPx is detected to be equal to or greater than the third reference value REF3 (S760), the voltage controller 620 sets the voltage level control signal CTRLV to a fourth level V14 and the clock generator 630 sets the pulse width of the clock pulse signal CPV to a fourth time H14 during the blank period BPx (S780).

Here, the first reference value REF1, the second reference value REF2, and the third reference value REF3 in FIG. 18 satisfy the following inequalities of the first reference value REF1<the second reference value REF2<the third reference value REF3, the first level V11, the second level V12, the third level V13, and the fourth level V14 satisfy the following inequalities of the first level V11>the second level V12>the third level V13>the fourth level V14, and the first time value H11, the second time value H12, the third time value H13, and the fourth time value H14 satisfy the following inequalities of the first time value H11>the second time value H12>the third time value H13>the fourth time value H14.

The clock generating circuit 153 shown in FIG. 10 sets the voltage level of the first ground voltage VSS1 in response to the voltage level control signal CTRLV and generates the first clock signal CKV and the second clock signal CKVB in response to the clock pulse signal CPV.

The driving circuit 150 shown in FIG. 10 sets the voltage level of the first ground voltage VSS1 in accordance with the duration of the blank period BPa, i.e., the frame rate, and generates the first clock signal CKV and the second clock signal CKVB, and thus the amount of the leakage current in the pixel may be controlled. Consequently, even though the frame rate is changed, the brightness difference does not occur, and the display quality may be prevented from being deteriorated.

Figure 19:
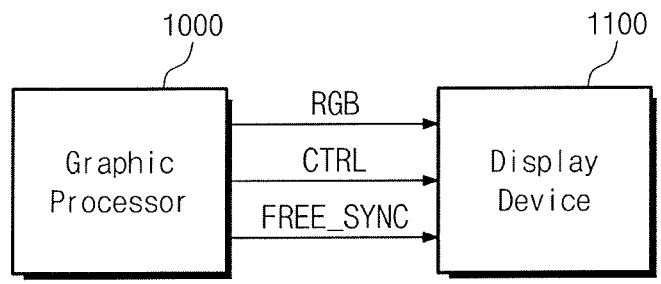
FIG. 19 is a block diagram showing an image display system according to an exemplary embodiment of the inventive concept.

FIG. 19 is a block diagram showing an image display system according to an exemplary embodiment of the present disclosure.

Referring to FIG. 19, the image display system includes a graphic processor 1000 and a display device 1100. In this embodiment, the graphic processor 1000 provides the image signal RGB, the control signal CTRL, and a frame rate variable signal FREE_SYNC to the display device 1100.

The frame rate variable signal FREE_SYNC is a signal indicating that the frame rate of the image signal RGB and the control signal CTRL provided from the graphic processor 1000 to the display device may be changed at every frame. FREE_SYNC can provide a dynamic refresh rate. FREE SYNC may consecutively change an order of the frame rate, for example, from about 120 fps, to about 80 fps, to about 40 fps. The frame rate of the image signal RGB and the control signal CTRL may be changed in accordance with a rendering speed of the graphic processor 1000.

Figure 20:
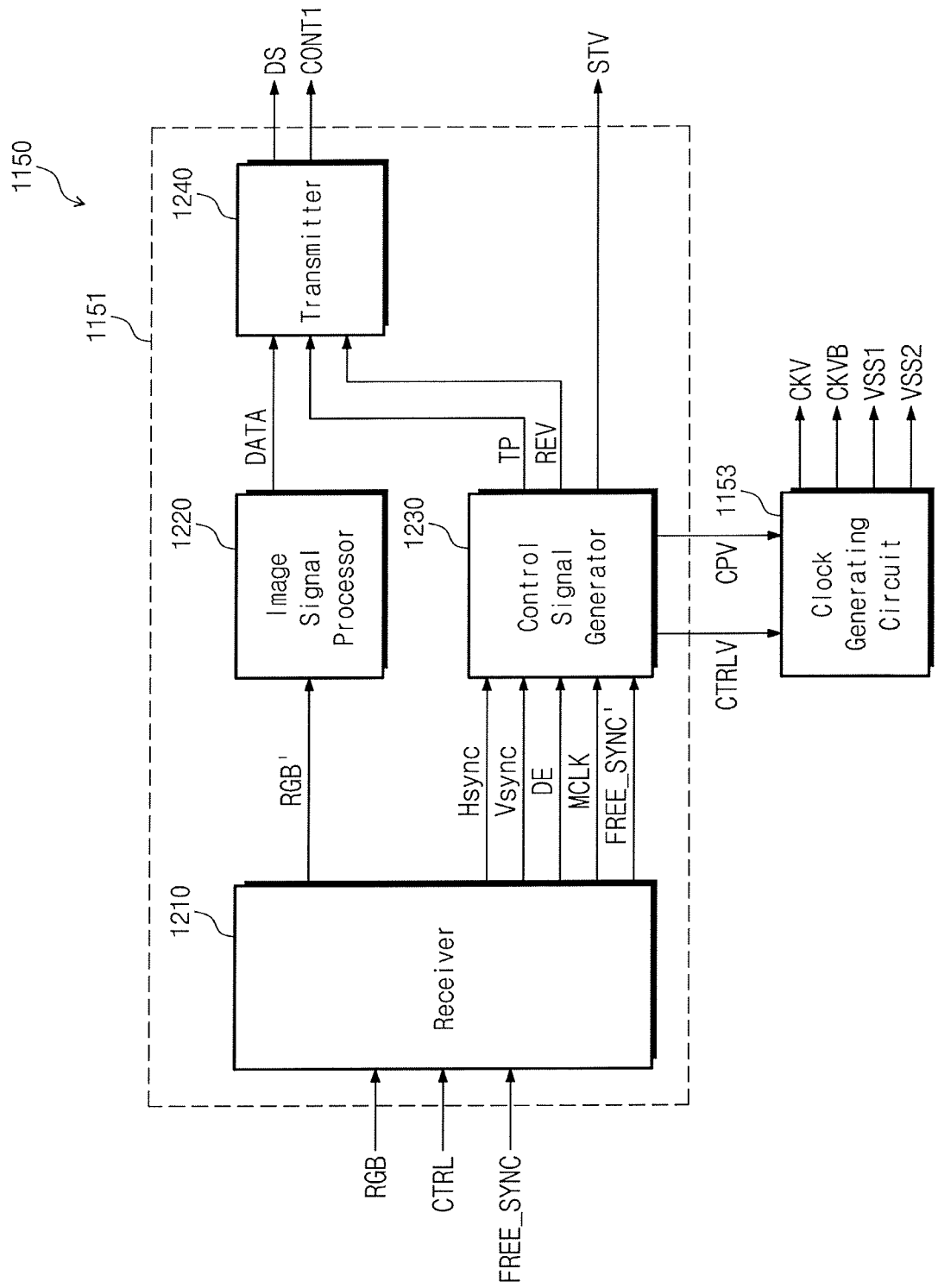
FIG. 20 is a block diagram showing a driving controller according to another exemplary embodiment of the inventive concept.

FIG. 20 is a block diagram showing a driving controller according to another exemplary embodiment of the inventive concept.

Referring to FIG. 20, the driving controller 1150 includes a controller 1151 and a clock generating circuit 1153. The driving controller 1150 outputs a control signal CONT1 to control the data driving circuit 140 shown in FIG. 1 and a data voltage signal RGB_DATA in response to the image signal RGB and the control signal CTRL provided from the outside (e.g. an external device) and outputs a first clock signal CKV, a second clock signal CKVB, and a driving voltage, which are to be provided to the gate driving circuit 130. The driving voltage may include a first ground voltage VSS1 and a second ground voltage VSS2. The driving controller 1150 restores a data enable signal DE including a display period and a blank period in one frame on the basis of the control signal CTRL and sets a voltage level of the driving voltage provided to the gate driving circuit 130 in accordance with a duration of the blank period. Hereinafter, the driving controller 1150 that changes a voltage level of the first ground voltage VSS1 provided to the gate driving circuit 130 in accordance with the duration of the blank period of the data enable signal DE will now be described.

In FIG. 20, the driving controller 1150 has substantially the same structure and function as those of the driving controller 150 shown in FIG. 10, and thus detailed descriptions thereof will be omitted.

The driving controller 1150 includes the controller 1151 and the clock generating circuit 1153. The controller 1151 includes a receiver 1210, an image signal processor 1220, a control signal generator 1230, and a transmitter 1240. The receiver 1210 restores the control signal CTRL to the data enable signal DE. The receiver 1210 may further restore a horizontal synchronization signal Hsync, a vertical synchronization signal Vsync, and a main clock signal MCLK on the basis of the control signal CTRL. The receiver 1210 restores the frame rate variable signal FREE_SYNC to a frame rate signal FREE_SYNC'.

The control signal generator 1230 receives the horizontal synchronization signal Hsync, the vertical synchronization signal Vsync, the data enable signal DE, the main clock signal MCLK, and the frame rate signal FREE_SYNC' and outputs a line latch signal TP, a reverse signal REV, a start signal STV, a voltage level control signal CRLV, and a clock pulse signal CPV.

Figure 21:
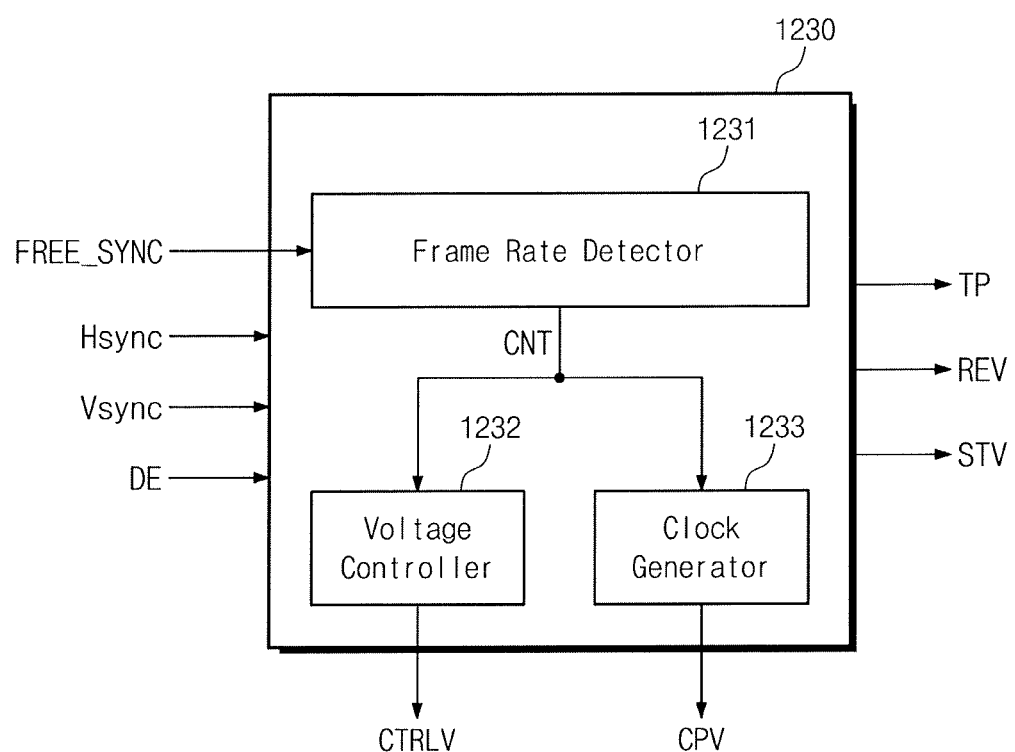
FIG. 21 is a block diagram showing a voltage signal generator according to another exemplary embodiment of the inventive concept.

FIG. 21 is a block diagram illustrating a control signal generator 1230 according to another exemplary embodiment of the present disclosure.

Referring to FIG. 21, the control signal generator 1230 includes a frame rate detector 1231 that detects a frame rate on the basis of the frame rate signal FREE_SYNC' and outputs a count signal CNT, a voltage controller 1232 that outputs the voltage level control signal CTRLV corresponding to the count signal CNT, and a clock generator 1233 outputting the clock pulse signal CPV in response to the data enable signal DE, the main clock signal MCLK, and the count signal CNT.

As described earlier with reference to FIG. 12, the voltage controller 1232 compares the count signal CNT with the first reference value REF1, the second reference value REF2, and the third reference value REF3, and the voltage controller sets the voltage level control signal CTRLV to one of the first to fourth levels V1 to V4 on the basis of the compared result.

As described earlier with reference to FIG. 15, the clock generator 1233 compares the count signal CNT with the first, second, and third reference values REF1, REF2, and REF3 and sets the pulse width of the clock pulse signal CPV of the blank period to one of the first to fourth times H1 to H4 on the basis of the compared result.

The driving controller 1150 shown in FIG. 20 may set the voltage level of the first ground voltage VSS1 on the basis of the frame rate signal FREE_SYNC and set the pulse width of the first clock signal CKV and the second clock signal CKVB in the blank period, and thus the amount of the leakage current in the pixel may be controlled. Therefore, even though the frame rate is changed, the brightness difference does not occur, and the display quality may be prevented from being deteriorated.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A display device comprising:
a display panel comprising a plurality of gate lines, a plurality of data lines, and a plurality of pixels respectively connected to the gate lines and respectively connected to the data lines;
a gate driving circuit having inputs to receive a clock signal and a driving voltage to drive the gate lines;
a data driving circuit configured to drive the data lines; and
a driving controller configured to control the data driving circuit in response to an input of an image signal and a control signal from an external source and output the clock signal and the driving voltage to the gate driving circuit, the driving controller configured to generate a data enable signal comprising a display period and a blank period in each of at least first and second successive frames and set a voltage level of the driving voltage applied to the gate driving circuit according to a duration of the blank period of each of the first and second frames, wherein, when the duration of the blank period of the second frame is longer than the duration of the blank period of the first frame, the driving controller sets the voltage level of the driving voltage during the second frame lower than the voltage level of the driving voltage during the first frame.

2. The display device of claim 1, wherein the driving controller sets the voltage level of the driving voltage to substantially maintain a value of a leakage current in at least some of the plurality of pixels from the first frame to the second frame.

3. The display device of claim 1, wherein the gate driving circuit drives the gate lines sequentially in response to the clock signal and discharges the gate lines to the voltage level of the driving voltage.

4. The display device of claim 1, wherein the driving controller comprises:
a controller configured to restore the data enable signal on the basis of the control signal, output a clock pulse signal in synchronization with the data enable signal, and configured to output a voltage level control signal corresponding to the duration of the blank period of the data enable signal.

5. The display device of claim 4, wherein the driving controller further comprises:
a clock generating circuit configured to generate the clock signal in response to the clock pulse signal and generate the driving voltage having a voltage level corresponding to the voltage level control signal.

6. A display device comprising:
a display panel comprising a plurality of gate lines, a plurality of data lines, and a plurality of pixels respectively connected to the gate lines and respectively connected to the data lines;
a gate driving circuit having inputs to receive a clock signal and a driving voltage to drive the gate lines;
a data driving circuit configured to drive the data lines; and
a driving controller configured to control the data driving circuit in response to an input of an image signal and a control signal from an external source and output the clock signal and the driving voltage to the gate driving circuit, the driving controller configured to generate a data enable signal comprising a display period and a blank period in each of at least first and second successive frames and set a voltage level of the driving voltage applied to the gate driving circuit according to a duration of the blank period of said each of the first and second frames,
wherein the driving controller comprises:
a controller including: a receiver configured to restore the data enable signal on the basis of the control signal; and a control signal generator configured to output the clock pulse signal in synchronization with the data enable signal and output a voltage level control signal corresponding to the duration of the blank period of the data enable signal; and a clock generating circuit configured to generate the clock signal in response to the clock pulse signal and generate the driving voltage having a voltage level corresponding to the voltage level control signal, wherein, when the duration of the blank period of the second frame is longer than the duration of the blank period of the first frame, the driving controller sets the voltage level of the driving voltage during the second frame lower than the voltage level of the driving voltage during the first frame.

7. The display device of claim 6, wherein the control signal generator comprises:
a frame rate detector configured to detect a frame rate on a basis of the display period and the blank period of the data enable signal;
a voltage controller configured to output the voltage level control signal corresponding to the detected frame rate by the frame rate detector; and
a clock generator configured to generate the clock pulse signal.

8. The display device of claim 7, wherein the control signal generator restores the data enable signal on the basis of the control signal at every frame and sets the voltage level of the driving voltage.

9. The display device of claim 8, wherein the driving controller comprises:
a frame memory configured to store the image signal of a present frame;
an image signal processor configured to convert an image signal of a previous frame output from the frame memory to a data voltage signal; and
a transmitter configured to output the data voltage signal to the data driving circuit, and the control signal generator restores the data enable signal on the basis of the control signal of the previous frame and sets the voltage level of the driving voltage applied to the gate driving circuit according to the duration of the blank period.

10. A method of driving a display device, comprising:
receiving a control signal;
generating a data enable signal on a basis of the control signal, the data enable signal being generated during each of first and second consecutive frames, the data enable signal having a first display period and a first blank period in the first frame and having a second display period and a second blank period in the second frame, wherein a duration of the second blank period is longer than a duration of the first blank period;
setting a driving voltage to a first voltage level during the first blank period;
setting the driving voltage to a second voltage level lower than the first voltage level during the second blank period;
outputting the driving voltage to a gate driving circuit; and
outputting the driving voltage to a gate line during each of the first blank period and the second blank period.

11. The method of claim 10, wherein the gate driving circuit discharges a plurality of gate lines connected to a plurality of pixels to the first voltage level of the driving voltage during the first blank period.

12. The method of claim 11, further comprising:
generating a clock pulse signal on the basis of the data enable signal;
setting a pulse width of the clock pulse signal to a first time value during the first blank period;

setting the pulse width of the clock pulse signal to a second time value during the second blank period; and outputting a clock signal corresponding to the clock pulse signal to the gate driving circuit.

13. The method of claim 12, wherein the gate driving circuit sequentially drives the gate lines in response to the clock signal.

14. The method of claim 12, wherein the first time value is longer than the second time value.

* * * * *